United States Patent
Ito et al.

(10) Patent No.: US 8,116,172 B2
(45) Date of Patent: Feb. 14, 2012

(54) NEAR-FIELD LIGHT GENERATING DEVICE INCLUDING SURFACE PLASMON GENERATING ELEMENT

(75) Inventors: Yasuhiro Ito, Tokyo (JP); Seiichi Takayama, Tokyo (JP); Eiji Komura, Tokyo (JP); Koji Shimazawa, Tokyo (JP); Satoshi Tomikawa, Tokyo (JP); Shuichi Okawa, Tokyo (JP)

(73) Assignee: TDK Corporation, Tokyo (JP)

( * ) Notice: Subject to any disclaimer, the term of this patent is extended or adjusted under 35 U.S.C. 154(b) by 460 days.

(21) Appl. No.: 12/320,930

(22) Filed: Feb. 9, 2009

(65) Prior Publication Data

US 2010/0202256 A1     Aug. 12, 2010

(51) Int. Cl.
 *G11B 11/00* (2006.01)
(52) U.S. Cl. ............... 369/13.33; 369/13.13; 360/59
(58) Field of Classification Search ............... 369/13.13, 369/13.33, 13.32, 13.02, 112.09, 112.14, 369/112.21, 112.27; 360/59; 385/129, 31, 385/88–94; 250/201.3, 201.5
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 2005/0249451 A1 | 11/2005 | Baehr-Jones et al. | |
| 2006/0187564 A1 | 8/2006 | Sato et al. | |
| 2007/0139818 A1 | 6/2007 | Shimazawa et al. | |
| 2010/0061200 A1* | 3/2010 | Shimazawa et al. | 369/13.33 |
| 2010/0103553 A1* | 4/2010 | Shimazawa et al. | 360/59 |
| 2010/0149930 A1* | 6/2010 | Komura et al. | 369/13.33 |
| 2010/0172220 A1* | 7/2010 | Komura et al. | 369/13.33 |
| 2011/0026378 A1* | 2/2011 | Shimazawa et al. | 369/13.33 |
| 2011/0026379 A1* | 2/2011 | Shimazawa et al. | 369/13.33 |
| 2011/0116349 A1* | 5/2011 | Komura et al. | 369/13.33 |

FOREIGN PATENT DOCUMENTS

| | | |
|---|---|---|
| JP | A-2001-255254 | 9/2001 |
| JP | A-2003-114184 | 4/2003 |
| JP | A-2005-004901 | 1/2005 |
| JP | A-2006-053978 | 2/2006 |
| JP | A-2006-185548 | 7/2006 |
| JP | A-2007-164935 | 6/2007 |
| JP | A-2008-111845 | 5/2008 |
| JP | A-2008 152897 | 7/2008 |

OTHER PUBLICATIONS

Hochberg et al., "Integrated plasmon and dielectric waveguides," *Optics Express* 5481, 2004, vol. 12, No. 22.

* cited by examiner

*Primary Examiner* — Tan X Dinh
(74) *Attorney, Agent, or Firm* — Oliff & Berridge, PLC

(57) ABSTRACT

A near-field light generating device includes: a base having a top surface; a waveguide that allows laser light to propagate therethrough and is disposed above the top surface of the base; and a surface plasmon generating element that is disposed above the top surface of the base so as to adjoin the waveguide in a direction parallel to the top surface of the base. The waveguide has a side surface that faces the surface plasmon generating element. The surface plasmon generating element includes: a coupling part that is opposed to a part of the side surface of the waveguide with spacing therebetween and causes excitation of a surface plasmon by coupling with evanescent light occurring from the part of the side surface; and a near-field light generating part that generates near-field light based on the surface plasmon excited at the coupling part.

16 Claims, 21 Drawing Sheets

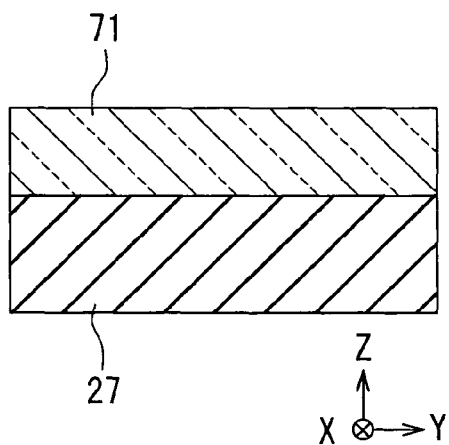
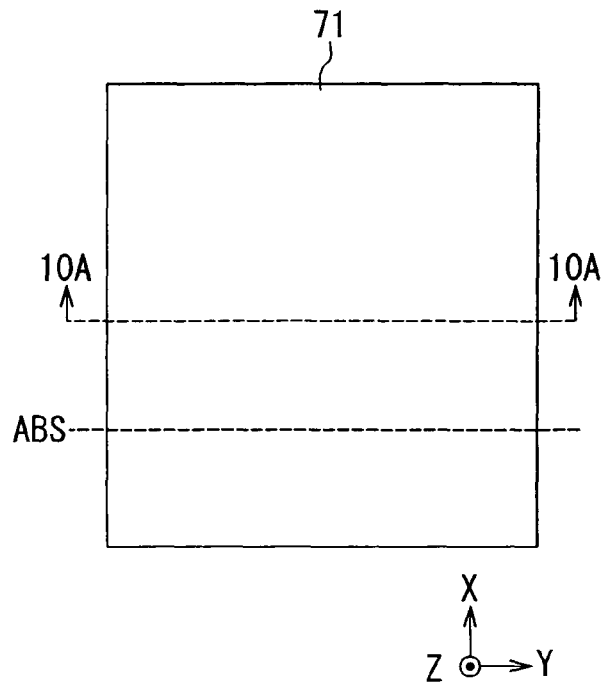
FIG. 10A          FIG. 10B
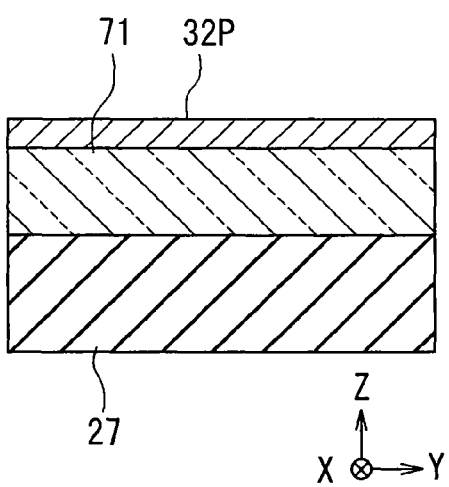
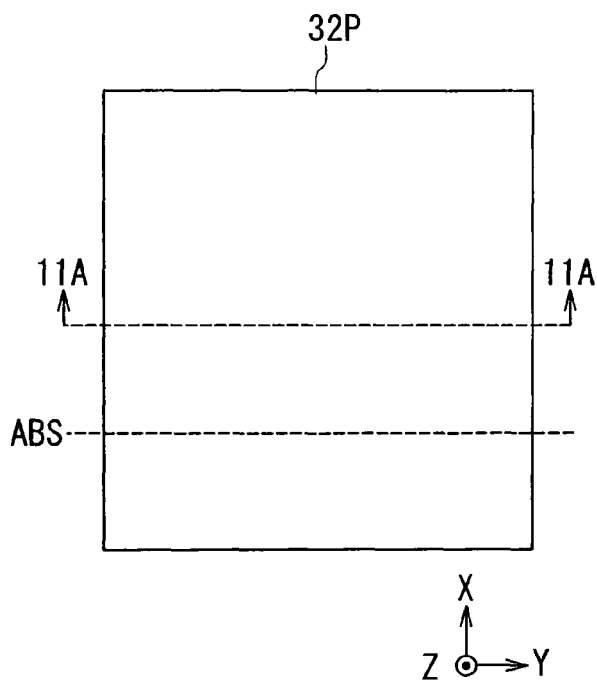
FIG. 11A          FIG. 11B

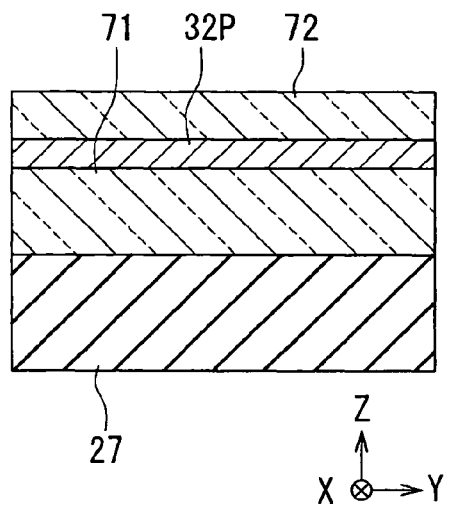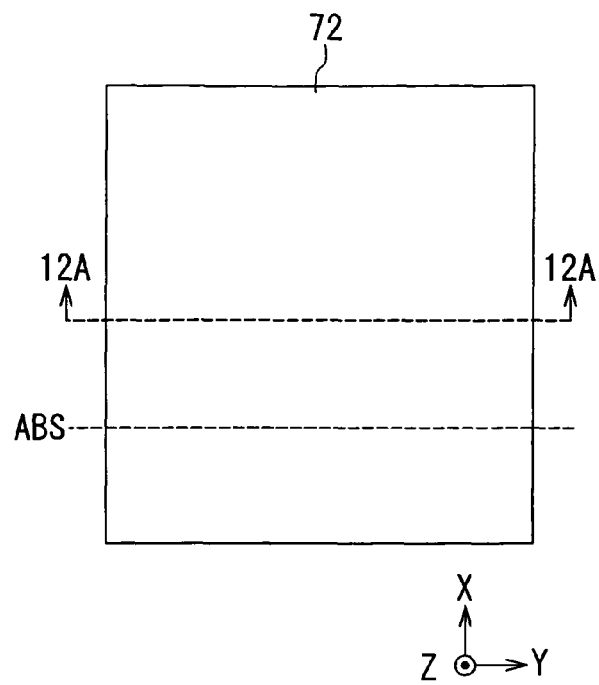
FIG. 12A  FIG. 12B
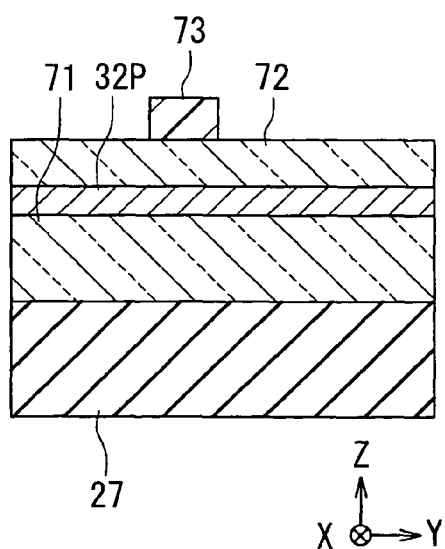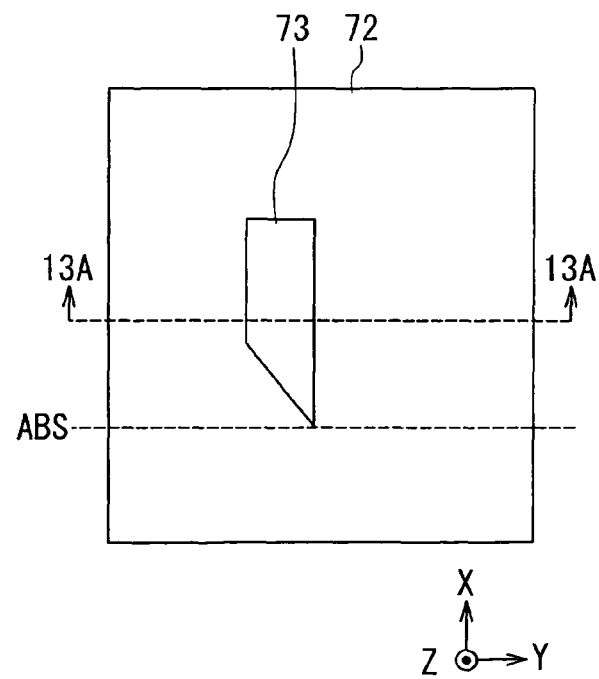
FIG. 13A  FIG. 13B

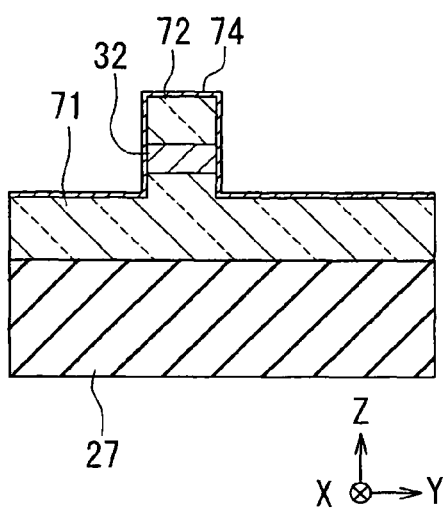
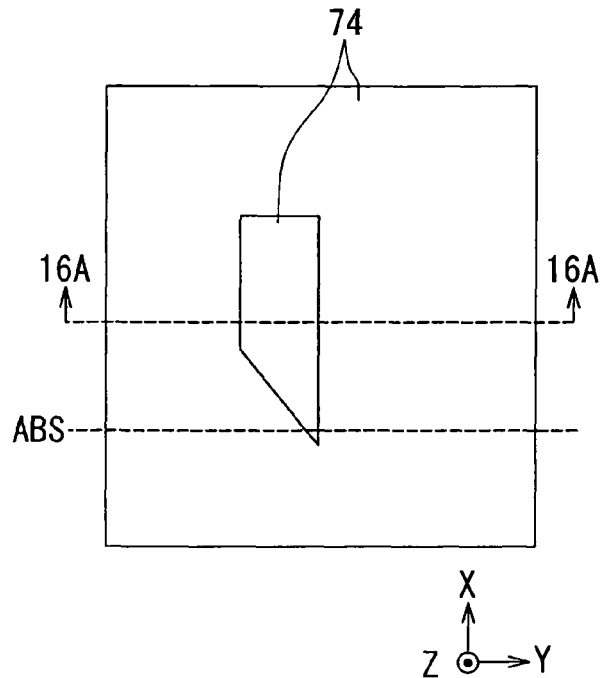
FIG. 16A
FIG. 16B
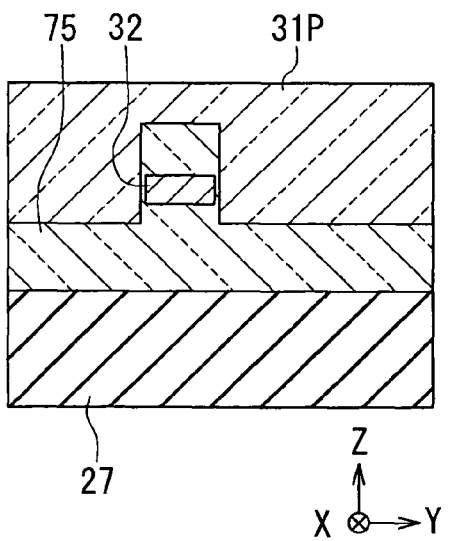
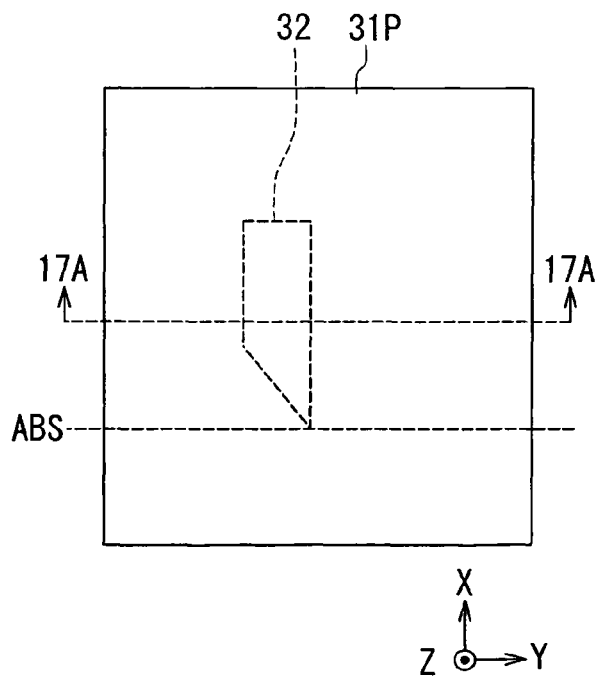
FIG. 17A
FIG. 17B

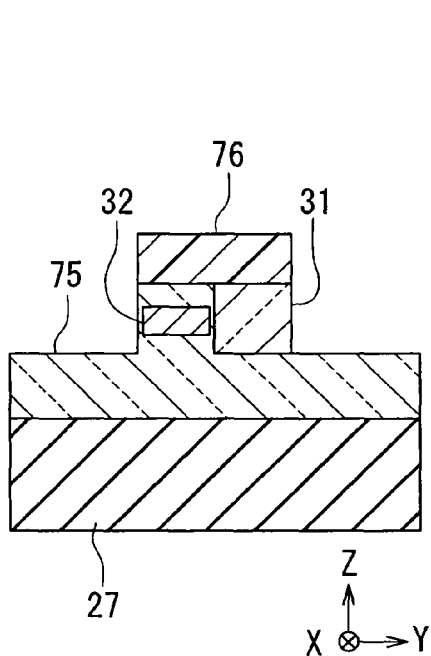 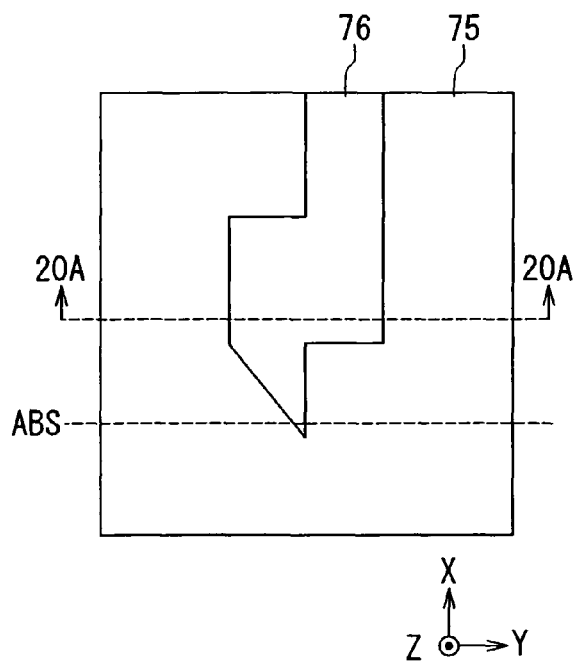
FIG. 20A     FIG. 20B
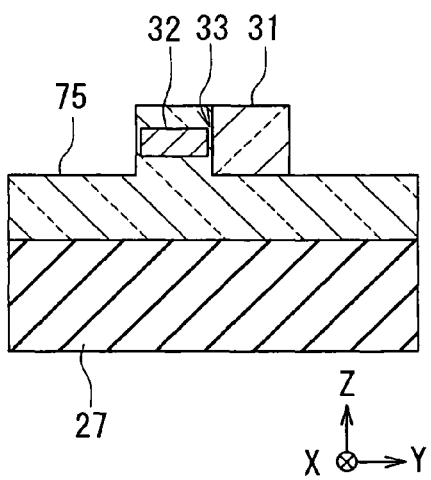 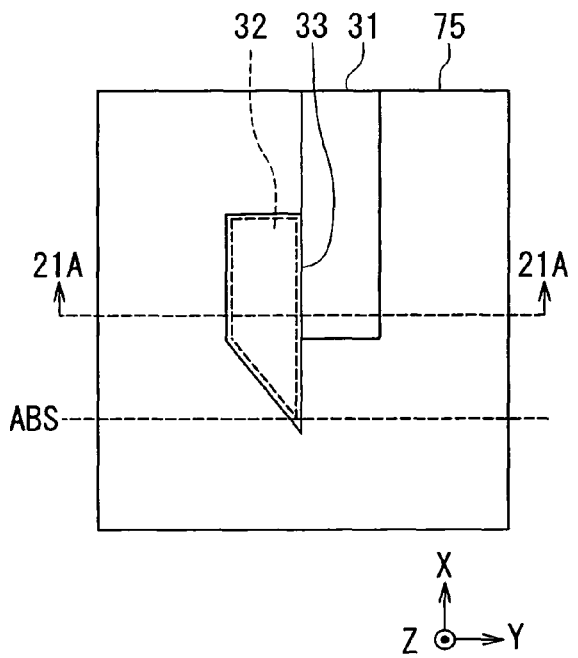
FIG. 21A     FIG. 21B

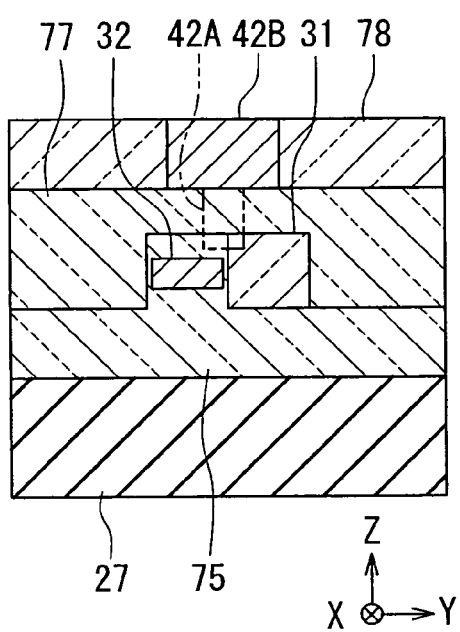 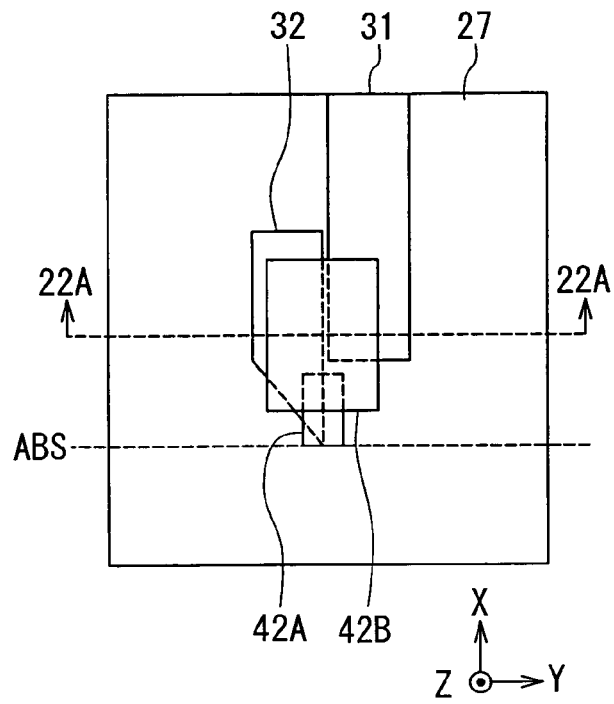
FIG. 22A          FIG. 22B
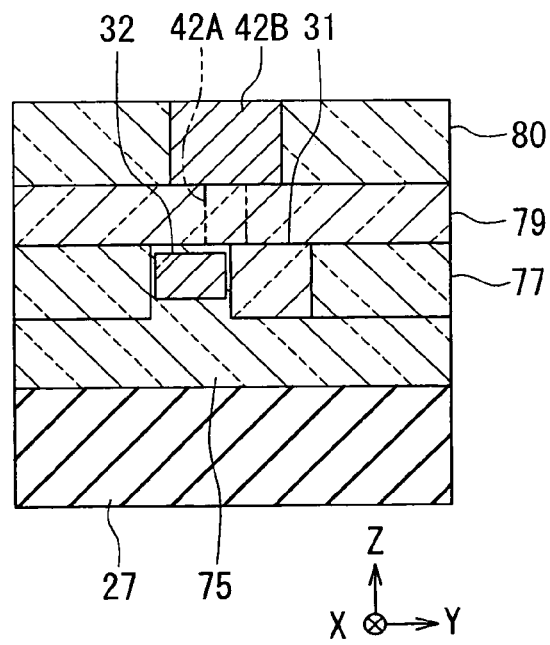
FIG. 23

NEAR-FIELD LIGHT GENERATING DEVICE INCLUDING SURFACE PLASMON GENERATING ELEMENT

BACKGROUND OF THE INVENTION

1. Field of the Invention

The present invention relates to a near-field light generating device for use in heat-assisted magnetic recording where a magnetic recording medium is irradiated with near-field light to lower the coercivity of the magnetic recording medium for data recording, and a heat-assisted magnetic recording head, a head gimbal assembly, and a magnetic recording device each of which includes the near-field light generating device.

2. Description of the Related Art

Recently, magnetic recording devices such as a magnetic disk drive have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) intended for reading and a recording head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. An index to show the thermal stability of magnetization of magnetic fine particles can be expressed as $K_u V / k_B T$, for example. $K_u$ is the anisotropic energy of the magnetic fine particles, $V$ is the volume of a single magnetic fine particle, $k_B$ is the Boltzmann constant, and $T$ is the absolute temperature. The greater $K_u V / k_B T$, the higher the thermal stability of magnetization of the magnetic fine particles. Making the magnetic fine particles smaller translates into smaller $V$, which by itself shrinks $K_u V / k_B T$. Then, $K_u$ may be increased instead. However, higher $K_u$ leads to higher coercivity of the magnetic recording medium. Since the magnitude of the magnetic field to be produced by the magnetic head for recording is mostly determined by the saturation flux density of the soft magnetic material that forms the magnetic pole, there is essentially an upper limit to the coercivity of the magnetic recording medium at which data recording is possible.

To solve the foregoing problem regarding the thermal stability, there has been proposed a technology called heat-assisted magnetic recording. Heat-assisted magnetic recording uses a magnetic recording medium made of high-$K_u$ magnetic material, and applies a magnetic field and heat to the magnetic recording medium at the same time to lower the coercivity of the magnetic recording medium for data recording. Hereinafter, a magnetic head for use in heat-assisted magnetic recording will be referred to as a heat-assisted magnetic recording head.

In heat-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with laser light. For example, U.S. Pat. No. 6,768,556 discloses a near-field optical probe (plasmon antenna) which includes a metal scatterer in the shape of a circular cone or the like formed on a substrate, and a film of a dielectric or the like formed around the scatterer.

JP-A 2008-111845 discloses such a technique that an apex of a scatterer that generates near-field light when irradiated with laser light is brought close to a magnetic recording medium, and electric charges are concentrated on this apex so that near-field light of high intensity occurs in the vicinity of the apex.

Conventional typical plasmon antennas generate near-field light when directly irradiated with laser light. If such a plasmon antenna is used as a near-field light generating part to achieve heat-assisted magnetic recording, however, there arises the following problem.

That is, while a plasmon antenna converts the laser light applied to itself into near-field light as mentioned above, its light use efficiency is known to reach only about 10% at most. Some 90% of the energy of the laser light applied to the plasmon antenna is reflected by the surface of the plasmon antenna, or converted into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbs the thermal energy. For example, a simulation has shown that a plasmon antenna made of Au, having the shape of an equilateral triangular plate with each side of 300 nm and being 50 nm thick reaches a temperature of 500° C. when it absorbs 17-mW laser light at room temperatures.

Such a temperature increase makes the plasmon antenna expand in volume and protrude from a medium facing surface, which is the surface of the heat-assisted magnetic recording head to face the magnetic recording medium. This causes an end of the reproducing head located in the medium facing surface to get farther from the magnetic recording medium, thereby causing the problem that a servo signal cannot be read during recording operations.

Under the circumstances, the inventors of the present application have devised such a technique that laser light propagating through a waveguide is coupled with a surface plasmon generating element in a surface plasmon mode via a buffer part, instead of directly irradiating a plasmon antenna with the laser light, and surface plasmons excited on the surface plasmon generating element are then allowed to propagate to the medium facing surface to obtain near-field light. This technique can avoid an excessive temperature increase of the surface plasmon generating element since the surface plasmon generating element is not directly irradiated with the laser light. Furthermore, according to this technique, one of the surfaces of the surface plasmon generating element farther from the magnetic pole can function as the surface with which the laser light is to be coupled via the buffer part (this surface is hereinafter referred to as coupling surface). This makes it possible to prevent the laser light from being absorbed by the magnetic pole.

How to guide laser light to the surface plasmon generating element in a heat-assisted magnetic recording head will now be considered. Heat-assisted magnetic recording typically uses a laser diode as the means for generating laser light. U.S. Patent Application Publication No. 2006/0187564 A1 discloses a technique in which a laser diode is placed on a side of the slider farther from the medium facing surface, and laser light emitted from this laser diode is guided to the medium facing surface through a wave guide formed in the slider. For the location of the laser diode in a heat-assisted magnetic recording head, the one disclosed in U.S. Patent Application Publication No. 2006/0187564 A1 is considered to be ideal because it facilitates heat dissipation of the laser diode and fabrication of the head, and allows stable guiding of the laser light to the medium facing surface. Thus, placing a laser diode on the side of the slider farther from the medium facing surface is conceivable also for a heat-assisted magnetic recording head that employs the foregoing technique of coupling laser light with the surface plasmon generating element via the buffer part.

Reference is now made to FIG. 35 and FIG. 36 to describe the relationship between the coupling surface of the surface plasmon generating element mentioned above and the direction of polarization of laser light that propagates through the waveguide. Each of FIG. 35 and FIG. 36 shows a configuration where a surface plasmon generating element 301 is laid over a waveguide with a buffer part in between. Hereinafter, laser light that propagates through a waveguide in such a stack structure including the waveguide will be referred to as TE-polarized light if its electric field oscillates in a direction parallel to the top and bottom surfaces (the surfaces opposite to each other in the stacking direction) of the waveguide, and will be referred to as TM-polarized light if its electric field oscillates in a direction perpendicular to the top and bottom surfaces of the waveguide. FIG. 35 shows the mode in which TE-polarized light propagates through the waveguide. In this mode, the electric field of the laser light propagating through the waveguide oscillates in a direction parallel to the coupling surface 301a of the surface plasmon generating element 301. FIG. 36 shows the mode in which TM-polarized light propagates through the waveguide. In this mode, the electric field of the laser light propagating through the waveguide oscillates in a direction perpendicular to the coupling surface 301a of the surface plasmon generating element 301. When the two modes shown in FIG. 35 and FIG. 36 are compared as to the intensity of surface plasmons occurring on the surface plasmon generating element 301, the mode shown in FIG. 36 provides surface plasmons of far higher intensity than the mode shown in FIG. 35 does. A simulation was performed with the waveguide of the same shape and material, the surface plasmon generating element 301 of the same shape and material, and the laser light of the same wavelength, and the results showed that the intensity of the surface plasmons occurring in the mode shown in FIG. 36 was approximately 50 times that of the surface plasmons occurring in the mode shown in FIG. 35. The mode shown in FIG. 36 is thus obviously preferred.

On the other hand, laser diodes include one that emits TE mode light whose electric field oscillates in a direction parallel to an active layer which is the layer for emitting the laser light (such a laser diode will be hereinafter referred to as a TE-polarization laser), and one that emits TM mode light whose electric field oscillates in a direction perpendicular to the active layer (such a laser diode will be hereinafter referred to as a TM-polarization laser). Of these, the TE-polarization laser is more common.

When forming a heat-assisted magnetic recording head in which laser light emitted from the laser diode and propagating through the waveguide is to be coupled with the surface plasmon generating element via the buffer part, there arises the following problem. To form such a head, the waveguide, the buffer part and the surface plasmon generating element may be stacked in this order or in the reverse order on the top surface of a base. In addition, the laser diode may be mounted on the top surface of a support member, and a side surface of the support member may be joined to a surface of the slider farther from the medium facing surface. In this case, the top surface of the base and the top surface of the support member become parallel to each other. FIG. 37 shows the positional relationship among the surface plasmon generating element 301, the waveguide 302, the laser diode 303 and the support member 304 in a head formed in the above-described manner. If a typical TE-polarization laser is used as the laser diode 303 in this configuration, it results in the mode where TE-polarized light, i.e., laser light whose electric field oscillates in the direction parallel to the coupling surface 301a of the surface plasmon generating element 301, propagates through the waveguide 302 (the mode shown in FIG. 35) as shown in FIG. 37. This causes the problem that the surface plasmon generating element 301 cannot generate surface plasmons of high intensity.

OBJECT AND SUMMARY OF THE INVENTION

It is an object of the present invention to provide a near-field light generating device which includes a waveguide and a surface plasmon generating element with which laser light propagating through the waveguide is coupled in a surface plasmon mode, wherein the surface plasmon generating element can generate surface plasmons of high intensity easily while using TE-polarized light as the laser light to propagate through the waveguide, and to provide a heat-assisted magnetic recording head, a head gimbal assembly and a magnetic recording device each of which includes the near-field light generating device.

A near-field light generating device according to the present invention includes: a base having a top surface; a waveguide that allows laser light to propagate therethrough and is disposed above the top surface of the base; and a surface plasmon generating element that is disposed above the top surface of the base so as to adjoin the waveguide in a direction parallel to the top surface of the base. The waveguide has a side surface that faces the surface plasmon generating element. The surface plasmon generating element includes: a coupling part that is opposed to a part of the side surface of the waveguide with spacing therebetween and causes excitation of a surface plasmon by coupling with evanescent light occurring from the part of the side surface; and a near-field light generating part that generates near-field light based on the surface plasmon excited at the coupling part.

In the near-field light generating device according to the present invention, evanescent light occurs from the part of the side surface of the waveguide to which the coupling part of the surface plasmon generating element is opposed. The coupling part causes excitation of a surface plasmon by coupling with the evanescent light, and the near-field light generating part generates near-field light based on this surface plasmon.

In the near-field light generating device according to the present invention, the surface plasmon generating element may be made of one element selected from the group consisting of Pd, Pt, Rh, Ir, Ru, Au, Ag, Cu and Al, or an alloy composed of a plurality of elements selected from this group.

The near-field light generating device according to the present invention may further include a buffer part that has a refractive index lower than that of the waveguide and is interposed between the part of the side surface of the waveguide and the coupling part.

In the near-field light generating device according to the present invention, the spacing between the part of the side surface of the waveguide and the coupling part preferably falls within a range of 10 to 200 nm. The coupling part preferably has a length within a range of 0.5 to 2.0 μm.

The near-field light generating device according to the present invention may further include a laser diode that emits laser light whose electric field oscillates in the direction parallel to the top surface of the base, i.e., TE-polarized light, and that allows the laser light to be incident on the waveguide. The near-field light generating device according to the present invention may further include a support member that supports the laser diode. The support member may have a top surface parallel to the top surface of the base, and the laser diode may be mounted on the top surface of the support member.

A heat-assisted magnetic recording head according to the present invention includes: a medium facing surface that faces a magnetic recording medium; a magnetic pole that has an end face located in the medium facing surface and produces a recording magnetic field for recording data on the magnetic recording medium; and a near-field light generating device that generates near-field light to be applied to the magnetic recording medium when data is recorded on the magnetic recording medium using the recording magnetic field. The near-field light generating device includes: a base having a top surface; a waveguide that allows laser light to propagate therethrough and is disposed above the top surface of the base; and a surface plasmon generating element that is disposed above the top surface of the base so as to adjoin the waveguide in a direction parallel to the top surface of the base.

In the heat-assisted magnetic recording head according to the present invention, the waveguide has a side surface that faces the surface plasmon generating element. The surface plasmon generating element includes: a coupling part that is opposed to a part of the side surface of the waveguide with spacing therebetween and causes excitation of a surface plasmon by coupling with evanescent light occurring from the part of the side surface; and a near-field light generating part that is located in the medium facing surface and generates the near-field light based on the surface plasmon excited at the coupling part.

In the heat-assisted magnetic recording head according to the present invention, the surface plasmon generating element may be made of one element selected from the group consisting of Pd, Pt, Rh, Ir, Ru, Au, Ag, Cu and Al, or an alloy composed of a plurality of elements selected from this group.

In the heat-assisted magnetic recording head according to the present invention, the near-field light generating device may further include a buffer part that has a refractive index lower than that of the waveguide and is interposed between the part of the side surface of the waveguide and the coupling part.

In the heat-assisted magnetic recording head according to the present invention, the spacing between the part of the side surface of the waveguide and the coupling part preferably falls within a range of 10 to 200 nm. The coupling part preferably has a length within a range of 0.5 to 2.0 μm.

In the heat-assisted magnetic recording head according to the present invention, the near-field light generating device may further include a laser diode that emits laser light whose electric field oscillates in the direction parallel to the top surface of the base, i.e., TE-polarized light, and that allows the laser light to be incident on the waveguide. The near-field light generating device may further include a support member that supports the laser diode. The support member may have a top surface parallel to the top surface of the base, and the laser diode may be mounted on the top surface of the support member.

A head gimbal assembly according to the present invention includes: a heat-assisted magnetic recording head; and a suspension that supports the heat-assisted magnetic recording head. The heat-assisted magnetic recording head includes: a medium facing surface that faces a magnetic recording medium; a magnetic pole that has an end face located in the medium facing surface and produces a recording magnetic field for recording data on the magnetic recording medium; and a near-field light generating device that generates near-field light to be applied to the magnetic recording medium when data is recorded on the magnetic recording medium using the recording magnetic field. The near-field light generating device includes: a base having a top surface; a waveguide that allows laser light to propagate therethrough and is disposed above the top surface of the base; a surface plasmon generating element that is disposed above the top surface of the base so as to adjoin the waveguide in a direction parallel to the top surface of the base; and a laser diode that emits laser light whose electric field oscillates in the direction parallel to the top surface of the base, i.e., TE-polarized light, and that allows the laser light to be incident on the waveguide.

In the head gimbal assembly according to the present invention, the waveguide has a side surface that faces the surface plasmon generating element. The surface plasmon generating element includes: a coupling part that is opposed to a part of the side surface of the waveguide with spacing therebetween and causes excitation of a surface plasmon by coupling with evanescent light occurring from the part of the side surface; and a near-field light generating part that is located in the medium facing surface and generates the near-field light based on the surface plasmon excited at the coupling part.

A magnetic recording device according to the present invention includes: a magnetic recording medium; a heat-assisted magnetic recording head; and a positioning device that supports the heat-assisted magnetic recording head and positions the same with respect to the magnetic recording medium. The heat-assisted magnetic recording head includes: a medium facing surface that faces the magnetic recording medium; a magnetic pole that has an end face located in the medium facing surface and produces a recording magnetic field for recording data on the magnetic recording medium; and a near-field light generating device that generates near-field light to be applied to the magnetic recording medium when data is recorded on the magnetic recording medium using the recording magnetic field. The near-field light generating device includes: a base having a top surface; a waveguide that allows laser light to propagate therethrough and is disposed above the top surface of the base; a surface plasmon generating element that is disposed above the top surface of the base so as to adjoin the waveguide in a direction parallel to the top surface of the base; and a laser diode that emits laser light whose electric field oscillates in the direction parallel to the top surface of the base, i.e., TE-polarized light, and that allows the laser light to be incident on the waveguide.

In the magnetic recording device according to the present invention, the waveguide has a side surface that faces the surface plasmon generating element. The surface plasmon generating element includes: a coupling part that is opposed to a part of the side surface of the waveguide with spacing therebetween and causes excitation of a surface plasmon by coupling with evanescent light occurring from the part of the side surface; and a near-field light generating part that is located in the medium facing surface and generates the near-field light based on the surface plasmon excited at the coupling part.

In the near-field light generating device according to the present invention, the waveguide and the surface plasmon generating element are disposed above the top surface of the base so as to adjoin each other in the direction parallel to the top surface of the base. Thus, according to the present invention, laser light whose electric field oscillates in the direction parallel to the top surface of the base, i.e., TE-polarized light, can be made incident on the waveguide using a typical TE-polarization laser. This makes it possible to achieve easy generation of surface plasmons of high intensity by the surface plasmon generating element while using TE-polarized light as the laser light to propagate through the waveguide.

Other and further objects, features and advantages of the present invention will appear more fully from the following description.

BRIEF DESCRIPTION OF THE DRAWINGS

FIG. 10A and FIG. 10B are explanatory diagrams showing a step of a method of manufacturing the near-field light generating device according to the embodiment of the present invention.

FIG. 11A and FIG. 11B are explanatory diagrams showing a step that follows the step of FIG. 10A and FIG. 10B.

FIG. 12A and FIG. 12B are explanatory diagrams showing a step that follows the step of FIG. 11A and FIG. 11B.

FIG. 13A and FIG. 13B are explanatory diagrams showing a step that follows the step of FIG. 12A and FIG. 12B.

FIG. 16A and FIG. 16B are explanatory diagrams showing a step that follows the step of FIG. 15A and FIG. 15B.

FIG. 17A and FIG. 17B are explanatory diagrams showing a step that follows the step of FIG. 16A and FIG. 16B.

FIG. 20A and FIG. 20B are explanatory diagrams showing a step that follows the step of FIG. 19A and FIG. 19B.

FIG. 21A and FIG. 21B are explanatory diagrams showing a step that follows the step of FIG. 20A and FIG. 20B.

FIG. 22A and FIG. 22B are explanatory diagrams showing a step that follows the step of FIG. 21A and FIG. 21B.

FIG. 23 is a cross-sectional view showing a modification example of the layout of the near-field light generating device and the magnetic pole in the heat-assisted magnetic recording head according to the embodiment of the present invention.

DETAILED DESCRIPTION OF THE PREFERRED EMBODIMENT

Figure 5:
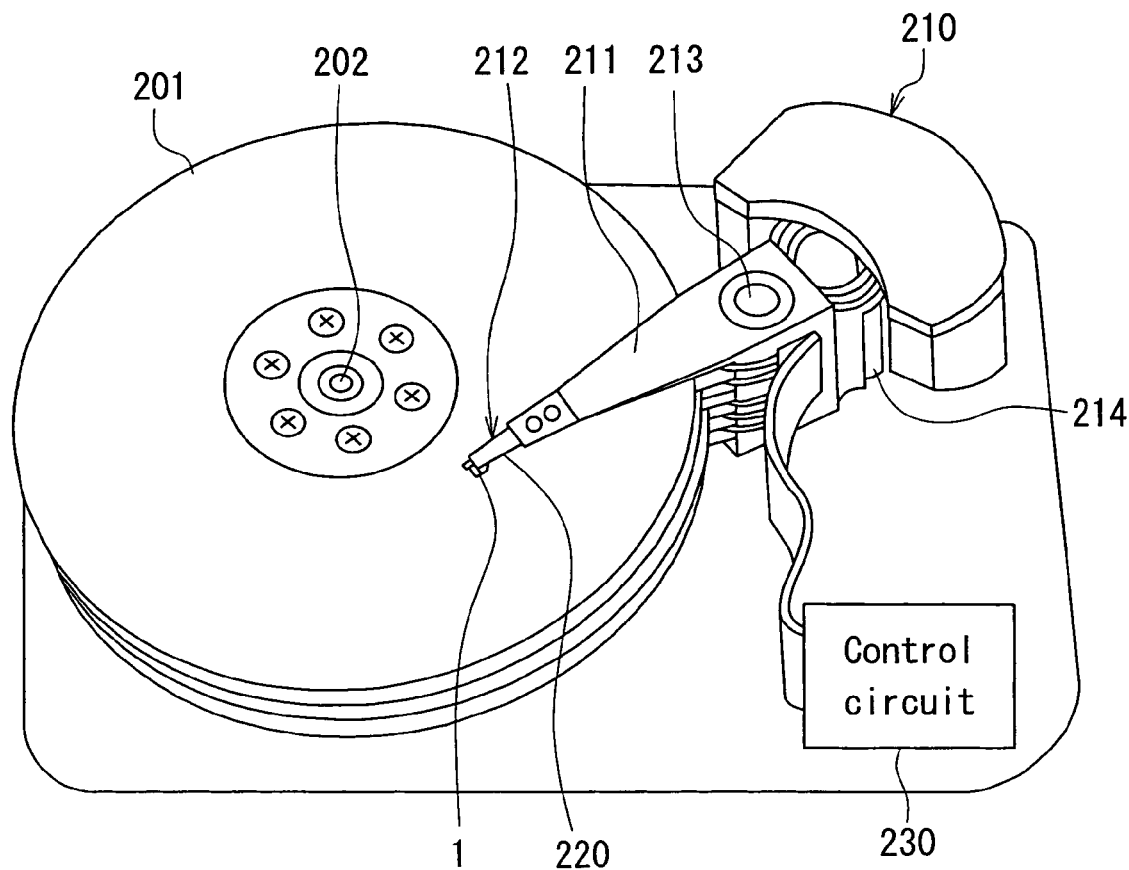
FIG. 5 is a perspective view of a magnetic recording device according to the embodiment of the present invention.

A preferred embodiment of the present invention will now be described in detail with reference to the drawings. Reference is first made to FIG. 5 to describe a magnetic disk drive as a magnetic recording device according to the embodiment of the invention. As shown in FIG. 5, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a heat-assisted magnetic recording head 1 according to the present embodiment, and a suspension 220 that supports the heat-assisted magnetic recording head 1.

The assembly carriage device 210 is a device for positioning each heat-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device according to the present invention is not structurally limited to the magnetic disk drive having the above-described configuration. For example, the magnetic recording device according to the present invention may be provided with a single magnetic disk 201, a single driving arm 211, a single head gimbal assembly 212 and a single heat-assisted magnetic recording head 1.

The magnetic disk drive further includes a control circuit 230 for controlling the recording and reproducing operations of each heat-assisted magnetic recording head 1 and also for controlling the light emitting operation of a laser diode serving as a light source for generating laser light for heat-assisted magnetic recording described later.

Figure 6:
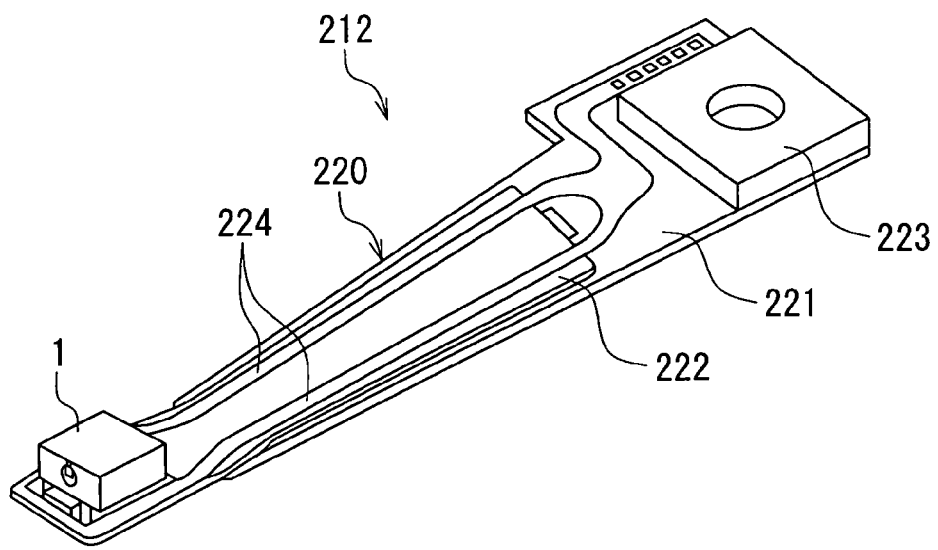
FIG. 6 is a perspective view of a head gimbal assembly according to the embodiment of the present invention.

FIG. 6 is a perspective view of the head gimbal assembly 212 of FIG. 5. As previously described, the head gimbal assembly 212 includes the heat-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The heat-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the heat-assisted magnetic recording head 1. The other end of the wiring member 224 is provided with a plurality of pad-shaped terminals arranged on the base part of the load beam 221.

The assembly carriage device 210 and the suspension 220 correspond to the positioning device according to the present invention. The head gimbal assembly according to the present invention is not limited to the one having the configuration shown in FIG. 6. For example, the head gimbal assembly according to the present invention may have an IC chip for driving the head somewhere along the suspension 220

Figure 7:
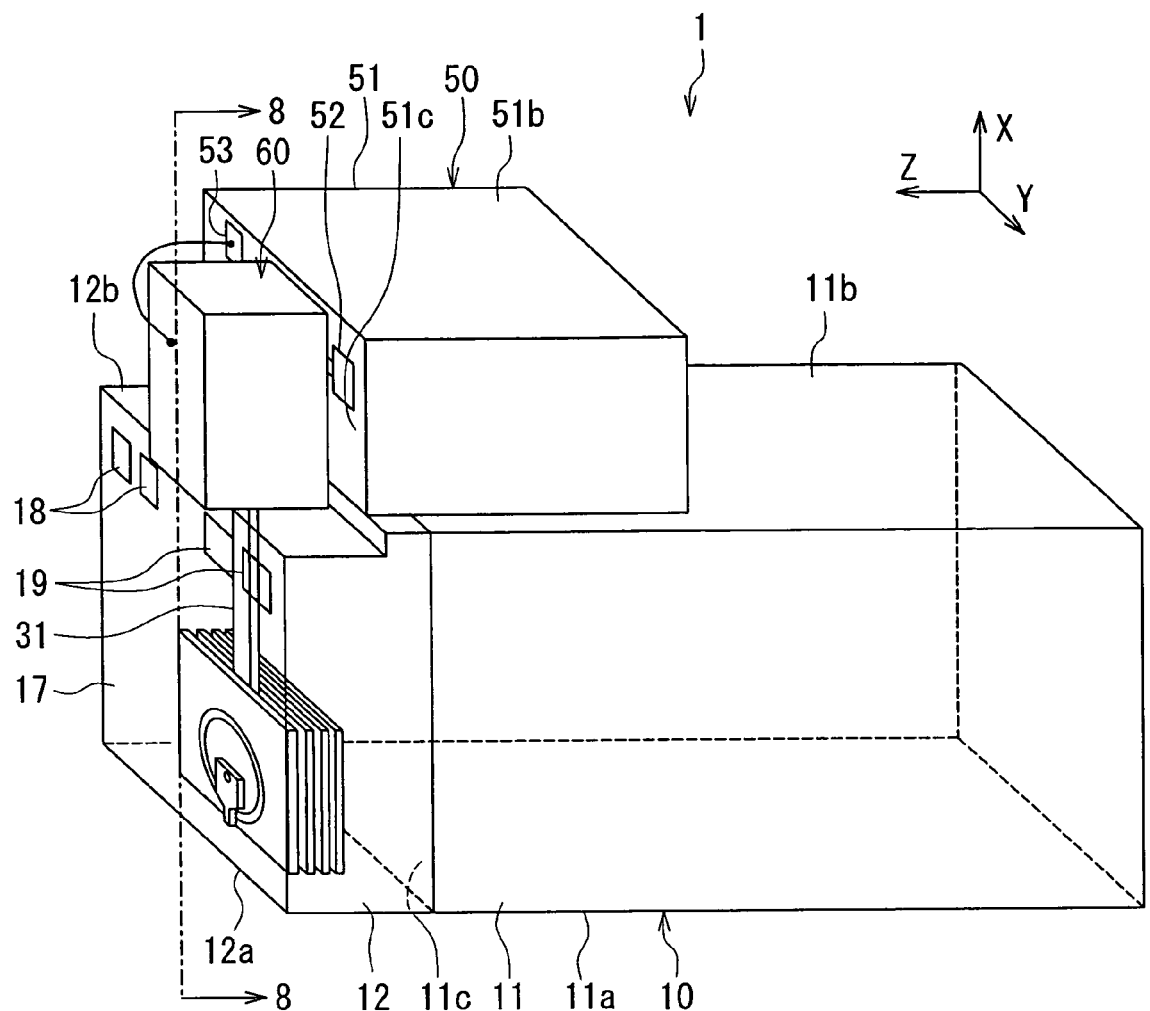
FIG. 7 is a perspective view of the heat-assisted magnetic recording head according to the embodiment of the present invention.
Figure 8:
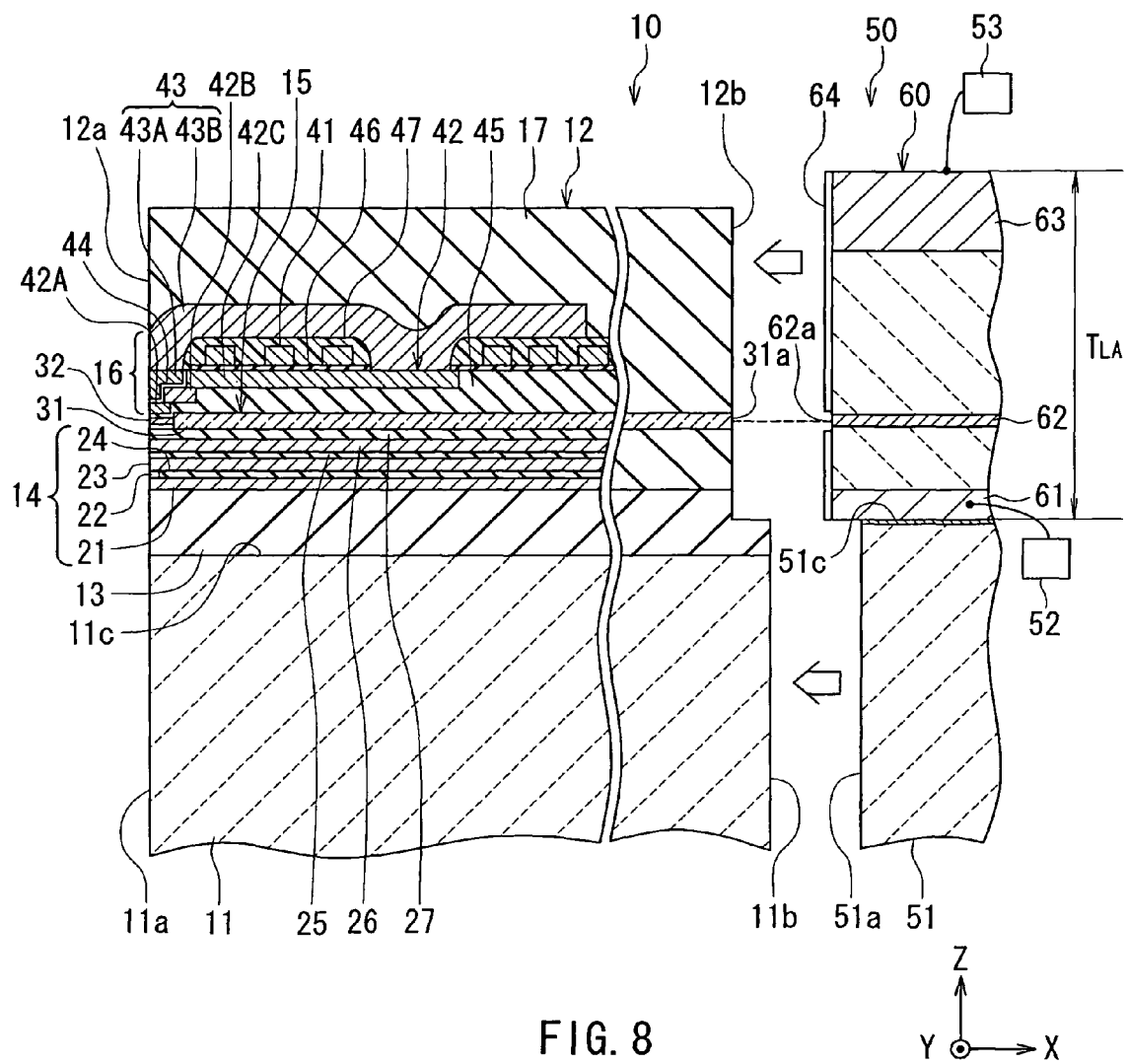
FIG. 8 shows a cross section taken along line 8-8 of FIG. 7.

The configuration of the heat-assisted magnetic recording head 1 according to the present embodiment will now be described with reference to FIG. 7 and FIG. 8. FIG. 7 is a perspective view of the heat-assisted magnetic recording head 1. FIG. 8 shows a cross section taken along line 8-8 of FIG. 7. The heat-assisted magnetic recording head 1 includes a slider 10 and a light source unit 50. FIG. 8 shows the slider 10 and the light source unit 50 in a separated state.

The slider 10 includes a slider substrate 11 and a head unit 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 with respect to the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

For the components of the head unit 12, a position located in a direction that is perpendicular to the element-forming surface 11c and gets away from the element-forming surface 11c is defined as "above", and a position located in a direction opposite to the above-mentioned direction is defined as "below". For any of the layers included in the head unit 12, the surface closer to the element-forming surface 11c is defined as a "bottom surface," and the surface farther from the element-forming surface 11c as a "top surface."

Moreover, X direction, Y direction, Z direction, -X direction, -Y direction and -Z direction will be defined as follows. The X direction is a direction perpendicular to the medium facing surface 11a and heading from the medium facing surface 11a toward the rear surface 11b. The Y direction is a direction parallel to the medium facing surface 11a and the element-forming surface 11c and heading from the back side to the front side of FIG. 8. The Z direction is a direction perpendicular to the element-forming surface 11c and getting away from the element-forming surface 11c. The -X direction, the -Y direction and the -Z direction are opposite to the X direction, the Y direction and the Z direction, respectively. As viewed from the slider 10, the magnetic disk 201 moves in the Z direction. The slider 10 has an air inflow end (a leading end) at the end of the medium facing surface 11a in the -Z direction. The slider 10 has an air outflow end (a trailing end) at the end of the medium facing surface 12a in the Z direction. A track width direction is a direction parallel to the Y direction.

The light source unit 50 includes a laser diode 60 serving as a light source for emitting laser light, and a rectangular-solid-shaped support member 51 that supports the laser diode 60. The support member 51 is made of, for example, a ceramic material such as aluminum oxide-titanium carbide ($Al_2O_3$—TiC). The support member 51 has a bonding surface 51a, a rear surface 51b opposite to the bonding surface 51a, and four surfaces connecting the bonding surface 51a to the rear surface 51b. One of the four surfaces connecting the bonding surface 51a to the rear surface 51b is a light-source-mounting surface 51c. The bonding surface 51a is the surface to be bonded to the rear surface 11b of the slider substrate 11. The light-source-mounting surface 51c is perpendicular to the bonding surface 51a and parallel to the element-forming surface 11c. The laser diode 60 is mounted on the light-source-mounting surface 51c. The light-source-mounting surface 51c corresponds to the top surface of the support member according to the present invention. The support member 51 may have the function of a heat sink for dissipating heat generated by the laser diode 60, in addition to the function of supporting the laser diode 60.

As shown in FIG. 8, the head unit 12 includes an insulating layer 13 disposed on the element-forming surface 11c, and a reproducing head 14, a near-field light generating device 15, a recording head 16 and a protection layer 17 that are stacked in this order on the insulating layer 13. The insulating layer 13 and the protection layer 17 are each made of an insulating material such as $Al_2O_3$ (hereinafter, also referred to as alumina).

The reproducing head 14 includes: a lower shield layer 21 disposed on the insulating layer 13; an MR element 22 disposed on the lower shield layer 21; an upper shield layer 23 disposed on the MR element 22; and an insulating layer 24 disposed between the lower shield layer 21 and the upper shield layer 23 around the MR element 22. The lower shield layer 21 and the upper shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element. When the MR element 22 is a TMR element or a CPP-type GMR element, the lower shield layer 21 and the upper shield layer 23 may also function as electrodes for feeding the sense current to the MR element 22. When the MR element 22 is a CIP-type GMR element, insulating films are respectively provided between the MR element 22 and the lower shield layer 21 and between the MR element 22 and the upper shield layer 23, and two leads are provided between these insulating films in order to feed the sense current to the MR element 22.

The head unit 12 further includes an insulating layer 25 disposed on the upper shield layer 23, and a middle shield layer 26 disposed on the insulating layer 25. The middle shield layer 26 has the function of shielding the MR element 22 from a magnetic field generated in the recording head 16. The insulating layer 25 is made of an insulating material such as alumina. The middle shield layer 26 is made of a soft magnetic material. The insulating layer 25 and the middle shield layer 26 can be dispensed with.

The near-field light generating device 15 generates near-field light to be applied to the magnetic disk 201 when data is recorded on the magnetic disk 201 using a recording magnetic field produced from the recording head 16. The near-field light generating device 15 includes: a base 27 disposed on the middle shield layer 26 and having a flat top surface; and a waveguide 31 and a surface plasmon generating element 32 both disposed above the top surface of the base 27. The base 27 is made of alumina, for example. The waveguide 31 has an incidence end 31a located in the rear surface 12a of the head unit 12. The configuration of the near-field light generating device 15 will be described in detail later.

The recording head 16 of the present embodiment is for use in perpendicular magnetic recording. The recording head 16 includes a coil 41, a magnetic pole 42, a write shield 43 and a gap layer 44. The coil 41 produces a magnetic field corresponding to data to be recorded on the magnetic disk 201. The magnetic pole 42 has an end face located in the medium facing surface 12a, allows a magnetic flux corresponding to the magnetic field produced by the coil 41 to pass, and produces a recording magnetic field for recording data on the magnetic disk 201 by means of a perpendicular magnetic recording system. The write shield 43 has an end face located in the medium facing surface 12a at a position forward of the magnetic pole 42 along the Z direction (in other words, located closer to the trailing end). The gap layer 44 is disposed between the magnetic pole 42 and the write shield 43. The magnetic pole 42 and the write shield 43 are each made of a soft magnetic material. The gap layer 44 is made of a nonmagnetic material. The distance between the end face of the magnetic pole 42 and the end face of the write shield 43 in the medium facing surface 12a is within the range of 0.01 to 0.5 µm, for example. The gap layer 44 may be made of a nonmagnetic insulating material such as $Al_2O_3$, $SiO_2$, AlN or diamond-like-carbon (DLC), or a nonmagnetic conductive material such as Ru.

The recording head 16 further includes an insulating layer 45 disposed around the magnetic pole 42, and an insulating layer 46 disposed on a part of each of the top surfaces of the magnetic pole 42 and the insulating layer 45. The coil 41 is disposed on the insulating layer 46. The recording head 16 further includes an insulating layer 47 covering the coil 41. The insulating layers 45 and 46 are made of alumina, for example. The insulating layer 47 is made of photoresist, for example. The coil 41 is made of a conductive material such as copper.

A part of the write shield 43 is disposed on the insulating layer 47. The write shield 43 is connected to a part of the top surface of the magnetic pole 42 away from the medium facing surface 12a. The position of the end of a bit pattern to be recorded on the magnetic disk 201 is determined by the position of an end of the end face of the magnetic pole 42 located closer to the gap layer 44 in the medium facing surface 12a. The write shield 43 takes in a magnetic flux that is generated from the end face of the magnetic pole 42 located in the medium facing surface 12a and that expands in directions except the direction perpendicular to the plane of the magnetic disk 201, and thereby prevents this flux from reaching the magnetic disk 201. It is thereby possible to improve the recording density. Furthermore, the write shield 43 takes in a disturbance magnetic field applied from outside the heat-assisted magnetic recording head 1 to the head 1. It is thereby possible to prevent erroneous recording on the magnetic disk 201 caused by the disturbance magnetic field intensively taken into the magnetic pole 42. The write shield 43 further has the function of returning a magnetic flux that has been generated from the end face of the magnetic pole 42 and has magnetized the magnetic disk 201.

As shown in FIG. 7, the head unit 12 further includes a pair of terminals 18 disposed on the top surface of the protection layer 17 and electrically connected to the MR element 22, and another pair of terminals 19 disposed on the top surface of the protection layer 17 and electrically connected to the coil 41. These terminals 18 and 19 are electrically connected to the plurality of pad-shaped terminals of the wiring member 224 shown in FIG. 6.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 µm. Specifically, the laser diode 60 may be an InGaAsP/InP quarternary mixed crystal laser diode having an emittable wavelength range of 1.2 to 1.67 µm, for example.

As shown in FIG. 8, the laser diode 60 has a multilayer structure including a lower electrode 61, an active layer 62 and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness $T_{LA}$ of around 60 to 200 μm, for example.

The light source unit 50 further includes a terminal 52 disposed on the light-source-mounting surface 51c and electrically connected to the lower electrode 61, and a terminal 53 disposed on the light-source-mounting surface 51c and electrically connected to the upper electrode 63. These terminals 52 and 53 are electrically connected to the plurality of pad-shaped terminals of the wiring member 224 shown in FIG. 6. When a predetermined voltage is applied to the laser diode 60 through the terminals 52 and 53, laser light is emitted from the emission center 62a of the laser diode 60. The laser diode 60 is a TE-polarization laser. The laser light emitted from the laser diode 60 is therefore TE mode light whose electric field oscillates in a direction parallel to the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is fixed to the slider 10 by bonding the bonding surface 51a of the support member 51 to the rear surface 11b of the slider substrate 11, as shown in FIG. 8. The laser diode 60 and the waveguide 31 are positioned so that the laser light emitted from the laser diode 60 will be incident on the incidence end 31a of the waveguide 31.

Figure 1:
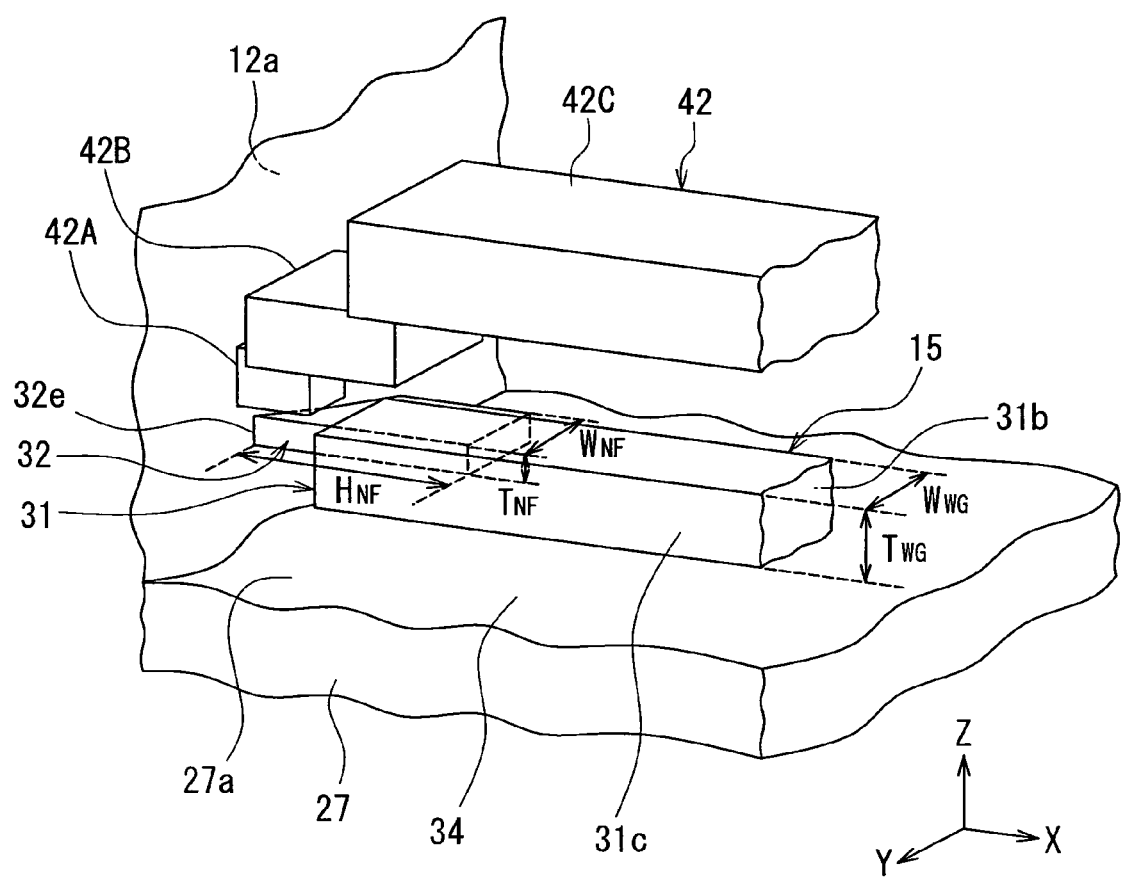
FIG. 1 is a perspective view showing a near-field light generating device and a magnetic pole of a heat-assisted magnetic recording head according to an embodiment of the present invention.
Figure 2:
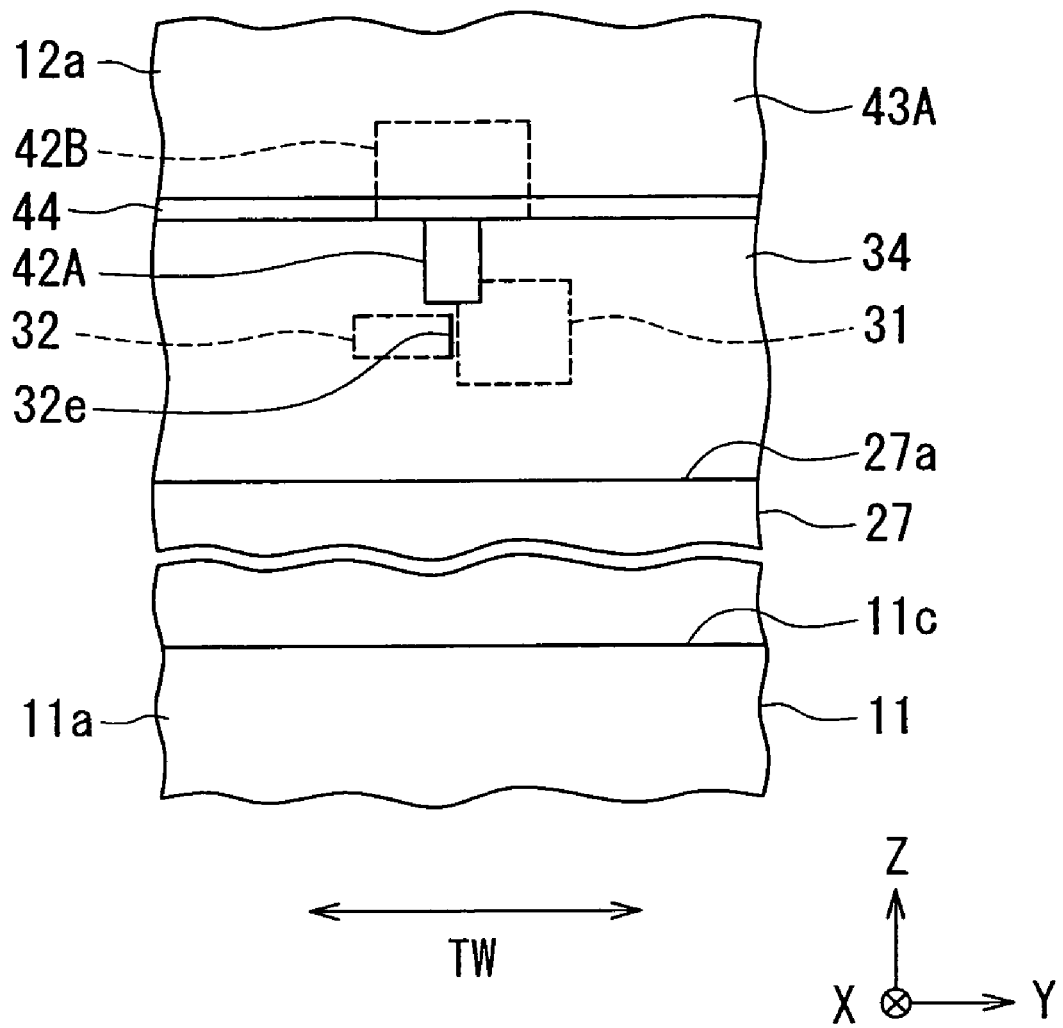
FIG. 2 is a front view showing a part of a medium facing surface of a head unit of the heat-assisted magnetic recording head according to the embodiment of the present invention.
Figure 3:
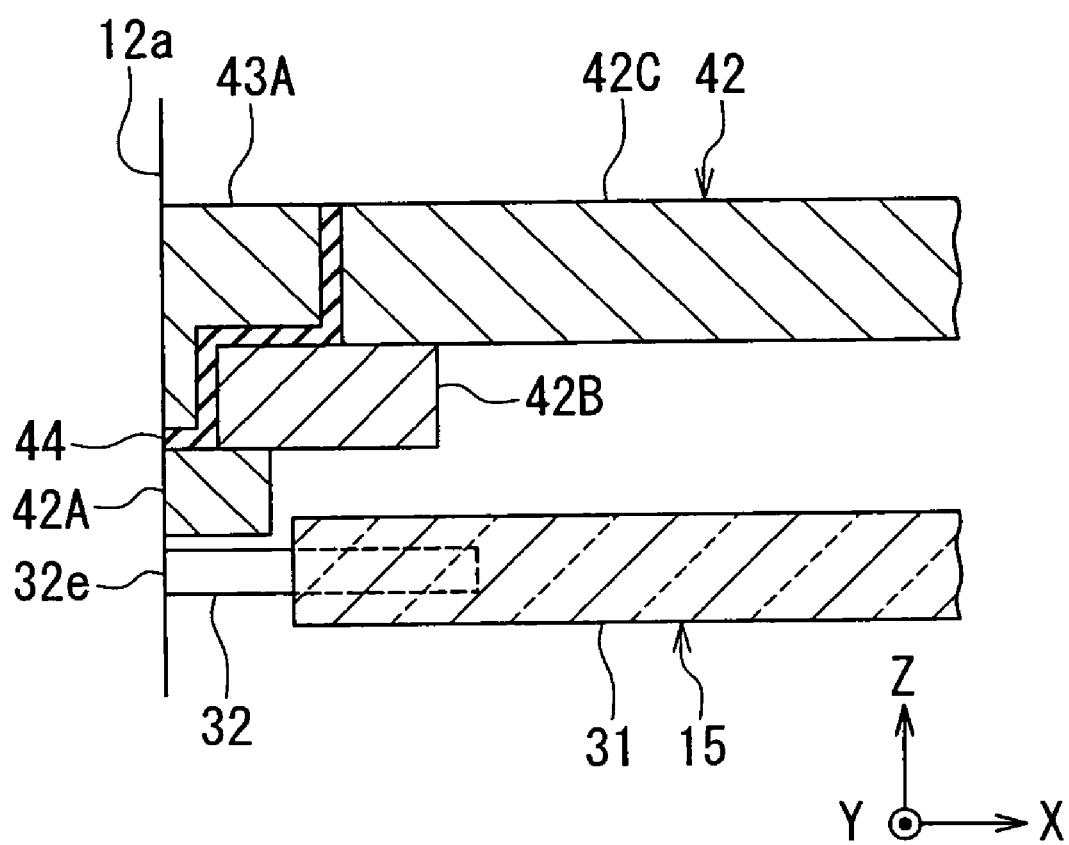
FIG. 3 is a cross-sectional view of the near-field light generating device and the magnetic pole of the heat-assisted magnetic recording head according to the embodiment of the present invention.
Figure 4:
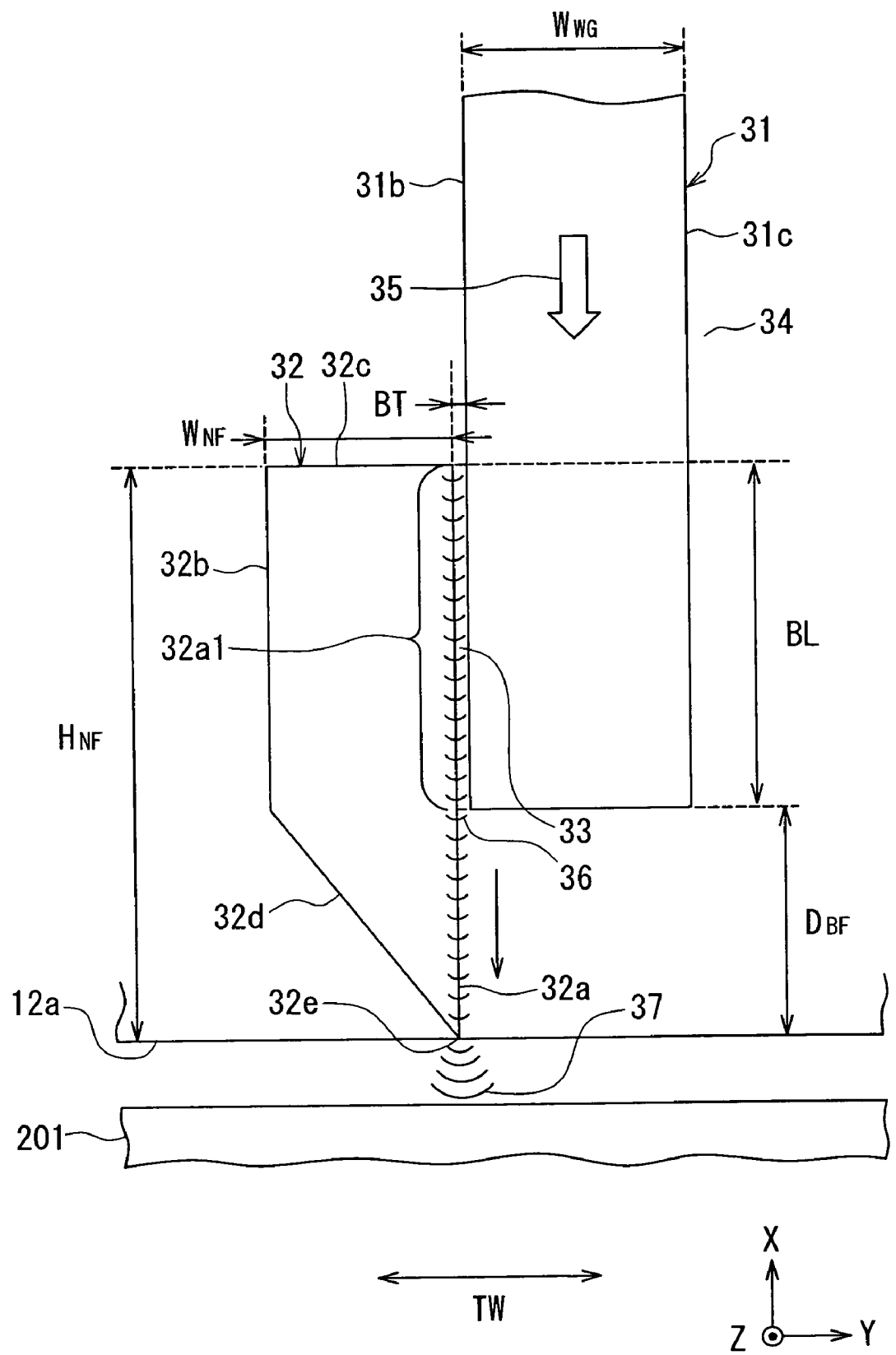
FIG. 4 is an explanatory diagram for explaining the principle of generation of near-field light by the near-field light generating device according to the embodiment of the present invention.

The configuration of the near-field light generating device 15 will now be described in detail with reference to FIG. 1 to FIG. 4. FIG. 1 is a perspective view showing the near-field light generating device 15 and the magnetic pole 42. FIG. 2 is a front view showing a part of the medium facing surface 12a of the head unit 12. FIG. 3 is a cross-sectional view of the near-field light generating device 15 and the magnetic pole 42. FIG. 4 is an explanatory diagram for explaining the principle of generation of near-field light by the near-field light generating device 15. In FIG. 2 and FIG. 4 the arrow designated by the symbol TW indicates the track width direction. The track width direction is parallel to the Y direction.

As previously described and shown in FIG. 1, the near-field light generating device 15 includes the base 27 having a top surface 27a, and also the waveguide 31 and the surface plasmon generating element 32 both disposed above the top surface 27a of the base 27. The top surface 27a of the base 27 is parallel to the element-forming surface 11c of the slider substrate 11 and the light-source-mounting surface 51c of the support member 51.

The waveguide 31 extends in the direction perpendicular to the medium facing surface 12a (the X direction). The waveguide 31 has a bottom surface, a top surface, and two side surfaces 31b and 31c connecting the top and bottom surfaces to each other. The side surface 31b faces the surface plasmon generating element 32. Of the side surfaces 31b and 31c, at least the side surface 31b is preferably perpendicular to the top surface 27a of the base 27. The waveguide 31 has an end face that is closer to the medium facing surface 12a. This end face may be located in the medium facing surface 12a or at a distance from the medium facing surface 12a. FIG. 1 to FIG. 4 show an example in which the end face of the waveguide 31 closer to the medium facing surface 12a is located at a distance from the medium facing surface 12a. The waveguide 31 allows propagation of laser light 35 that is emitted from the laser diode 60 and incident on the incidence end 31a located in the rear surface 12b of the head unit 12. This laser light 35 is TE-polarized light whose electric field oscillates in the direction parallel to the top surface 27a of the base 27.

In the proximity of the surface plasmon generating element 32, the waveguide 31 has a width $W_{WG}$ of, for example, 0.3 to 5 μm in the track width direction (the Y direction) and a thickness (dimension in the Z direction) $T_{WG}$ of, for example, 0.1 to 5 μm.

The surface plasmon generating element 32 is disposed above the top surface 27a of the base 27 so as to adjoin the waveguide 31 in the direction parallel to the top surface 27a of the base 27. In the example shown in FIG. 4, the surface plasmon generating element 32 has a bottom surface, a top surface, and four side surfaces 32a, 32b, 32c and 32d connecting the top and bottom surfaces to each other. The side surface 32a extends in the direction perpendicular to the medium facing surface 12a (the X direction). A part of the side surface 32a is opposed to a part of the side surface 31b of the waveguide 31 with a predetermined spacing therebetween. An end of the side surface 32a is located in the medium facing surface 12a. The side surface 32a is preferably perpendicular to the top surface 27a of the base 27. The side surface 32b lies opposite to the side surface 32a and extends in the direction perpendicular to the medium facing surface 12a (the X direction). An end of the side surface 32b closer to the medium facing surface 12a is located at a distance from the medium facing surface 12a. The side surface 32c is parallel to the medium facing surface 12a and connects the side surfaces 32a and 32b to each other at their respective ends farther from the medium facing surface 12a. The side surface 32d connects the end of the side surface 32a located in the medium facing surface 12a to the end of the side surface 32b closer to the medium facing surface 12a. The side surface 32d is tilted with respect to the direction perpendicular to the medium facing surface 12a (the X direction) so that the distance between the side surfaces 32a and 32d in the Y direction decreases toward the medium facing surface 12a.

The maximum width $W_{NF}$ of the surface plasmon generating element 32 in the track width direction (the Y direction) and the thickness (dimension in the Z direction) $T_{NF}$ of the surface plasmon generating element 32 may both be sufficiently smaller than the wavelength of the laser light 35, falling within the range of approximately 10 to 100 nm, for example. The surface plasmon generating element 32 may have a length $H_{NF}$ of, for example, approximately 0.8 to 6.0 μm in the X direction.

The part of the side surface 32a that is opposed to the part of the side surface 31b of the waveguide 31 with spacing serves as a coupling part 32a1 which causes excitation of surface plasmons 36 by coupling with evanescent light occurring from the part of the side surface 31b. The surface plasmon generating element 32 further has a near-field light generating part 32e which is the edge formed between the side surfaces 32a and 32d and located in the medium facing surface 12a. The surface plasmons 36 excited at the coupling part 32a1 propagate along the side surface 32a to the near-field light generating part 32e, and near-field light 37 occurs from this near-field light generating part 32e based on the surface plasmons 36.

The near-field light generating device 15 further includes a buffer part 33 which is interposed between the part of the side surface 31b of the waveguide 31 and the coupling part 32a1 of the surface plasmon generating element 32. The buffer part 33 has a refractive index lower than that of the waveguide 31.

As shown in FIG. 4, the spacing between the part of the side surface 31b of the waveguide 31 and the coupling part 32a1 of the surface plasmon generating element 32, or equivalently, the thickness of the buffer part 33 in the Y direction, will be denoted as BT. The length of the coupling part 32a1, i.e., the length of the buffer part 33, will be denoted as BL. More precisely, the length of the coupling part 32a1 refers to that of the coupling part 32a1 in the direction perpendicular to the medium facing surface 12a (the X direction). BT and BL are essential parameters for achieving appropriate excitation and propagation of surface plasmons. BT preferably falls within the range of 10 to 200 nm. BL preferably falls within the range of 0.5 to 2.0 μm. The respective preferable ranges of BT and BL have been determined by simulations to be described later.

The distance $D_{BF}$ between the medium facing surface 12a and an end of the buffer part 33 closer to the medium facing surface 12a falls within the range of 0 to 2.0 μm, for example.

As modification examples will be given later, the shapes and layout of the waveguide 31 and the surface plasmon generating element 32 are not limited to the example shown in FIG. 4.

The waveguide 31 is covered with a clad part 34, excluding the incidence end 31a and the portion in contact with the buffer part 33. The clad part 34 has a refractive index lower than that of the waveguide 31. For example, if the laser light 35 has a wavelength of 600 nm and the clad part 34 is made of $SiO_2$ (refractive index n=1.46), the waveguide 31 may be made of $Al_2O_3$ (n=1.63). If the clad part 34 is made of $Al_2O_3$ (n=1.63), the waveguide 31 may be made of $SiO_xN_y$ (n=1.7 to 1.85), $Ta_2O_5$ (n=2.16), $Nb_2O_5$ (n=2.33), TiO (n=2.3 to 2.55), or $TiO_2$ (n=2.3 to 2.55). When the waveguide 31 is made of such materials as mentioned above, it is possible to suppress the propagation loss of the laser light 35 by virtue of the favorable optical characteristics of the materials themselves. The provision of the clad part 34 allows total reflection of the laser light 35 at the surfaces of the waveguide 31 covered with the clad part 34, thereby improving the propagation efficiency of the laser light 35 through the waveguide 31.

The clad part 34 may constitute at least a part of the gap layer 44 shown in FIG. 3. The clad part 34 may also constitute at least a part of the insulating layer 45 shown in FIG. 8.

The surface plasmon generating element 32 is made of a conductive material such as metal. For example, the surface plasmon generating element 32 may be made of one element selected from the group consisting of Pd, Pt, Rh, Ir, Ru, Au, Ag, Cu and Al, or an alloy composed of a plurality of elements selected from this group.

The buffer part 33 is made of a dielectric material having a refractive index lower than that of the waveguide 31. For example, if the laser light 35 has a wavelength of 600 nm and the waveguide 31 is made of $Al_2O_3$ (n=1.63), the buffer part 33 may be made of $SiO_2$ (n=1.46). If the waveguide 31 is made of $Ta_2O_5$ (n=2.16), the buffer part 33 may be made of $SiO_2$ (n=1.46) or $Al_2O_3$ (n=1.63). The buffer part 33 may be made of a material the same as that of the clad part 34.

While the foregoing description has dealt with the case where the laser diode 60 is not included in the components of the near-field light generating device 15, the near-field light generating device according to the present invention may include the laser diode 60 in addition to the components of the near-field light generating device 15.

Reference is now made to FIG. 4 to describe the principle of generation of near-field light by the near-field light generating device 15 and the principle of heat-assisted magnetic recording using the near-field light. The laser light 35 emitted from the laser diode 60 propagates through the waveguide 31 to reach near the buffer part 33. Here, the laser light is totally reflected at the part of the side surface 31b of the waveguide 31 that is opposed to the coupling part 32a1 of the surface plasmon generating element 32, i.e., at the interface between the waveguide 31 and the buffer part 33. This generates evanescent light to permeate into the buffer part 33. Next, this evanescent light and fluctuations of charges excited on the coupling part 32a1 of the surface plasmon generating element 32 are coupled with each other to induce a surface plasmon mode, whereby surface plasmons are excited. To be more precise, what are excited in this system are surface plasmon polaritons because surface plasmons, which are the elementary excitations, are coupled with electromagnetic waves. Nevertheless, surface plasmon polaritons will hereinafter be referred to as surface plasmons, with polariton omitted. The above-described induction of a surface plasmon mode is disclosed in, for example, Michael Hochberg, Tom Baehr-Jones, Chris Walker & Axel Scherer, "Integrated plasmon and dielectric waveguides," OPTICS EXPRESS Vol. 12, No. 22, pp. 5481-5486 (2004), and U.S. Patent Application Publication No. 2005/0249451 A1.

In the present embodiment, the laser light 35 propagating through the waveguide 31 is TE-polarized light whose electric field oscillates in the direction parallel to the top surface 27a of the base 27. That is, the electric field of the laser light 35 oscillates in the direction parallel to the Y direction in FIG. 4. The direction of oscillation of the electric field of the laser light 35 intersects the coupling part 32a1 of the surface plasmon generating element 32. The phrase "the direction of oscillation of the electric field of the laser light 35 intersects the coupling part 32a1" is intended to cover the case where the direction of oscillation of the electric field of the laser light 35 is perpendicular to the coupling part 32a1. According to the present embodiment, the surface plasmon generating element 32 can thus generate surface plasmons of high intensity since the direction of oscillation of the electric field of the laser light 35 intersects the coupling part 32a1. In particular, when the coupling part 32a1 is perpendicular to the top surface 27a of the base 27, the direction of oscillation of the electric field of the laser light 35 becomes perpendicular to the coupling part 32a1, so that the surface plasmon generating element 32 can generate surface plasmons of higher intensity.

The surface plasmons 36 excited at the coupling part 32a1 propagate along the side surface 32a of the surface plasmon generating element 32 toward the near-field light generating part 32e. As a result, the surface plasmons 36 concentrate on the near-field light generating part 32e, and near-field light 37 thus occurs from the near-field light generating part 32e based on the surface plasmons 36. The near-field light 37 is projected toward the magnetic disk 201, reaches the surface of the magnetic disk 201, and heats a part of the magnetic recording layer of the magnetic disk 201. This lowers the coercivity of the part of the magnetic recording layer. In heat-assisted magnetic recording, data recording is performed by applying a recording magnetic field produced by the magnetic pole 42 to the part of the magnetic recording layer whose coercivity has been lowered in this way.

An example of the configuration of the magnetic pole 42 will now be described with reference to FIG. 1 to FIG. 3. In this example, the magnetic pole 42 includes a first layer 42A, a second layer 42B and a third layer 42C. As shown in FIG. 2, the first layer 42A has an end face located in the medium facing surface 12a at a position forward of the near-field light generating part 32e along the Z direction (in other words, located closer to the trailing end). The distance between the end face of the first layer 42A and the near-field light generating part 32e preferably falls within the range of 50 to 150 nm. The length of the first layer 42A in the direction perpendicular to the medium facing surface 12a (the X direction) is smaller than the distance $D_{BF}$ between the medium facing surface 12a and the end of the buffer part 33 closer to the medium facing surface 12a. The second layer 42B is disposed on the first layer 42A, touching the top surface of the first layer 42A. The second layer 42B has an end face closer to the medium facing surface 12a, and this end face is located at a distance from the medium facing surface 12a. The third layer 42C is disposed on the second layer 42B, touching the top surface of the second layer 42B. The third layer 42C has an end face closer to the medium facing surface 12a, and this end face is located at a distance from the medium facing surface 12a. The distance between the end face of the third layer 42C and the medium facing surface 12a is greater than the distance between the end face of the second layer 42B and the medium facing surface 12a.

Next, an example of the configuration of the write shield 43 will be described with reference to FIG. 3 and FIG. 8. In this example, the write shield 43 includes a first layer 43A and a second layer 43B. As shown in FIG. 3, the first layer 43A is separated from the magnetic pole 42 by the gap layer 44 and disposed between the medium facing surface 12a and the respective end faces of the second layer 42B and the third layer 42C of the magnetic pole 42. As shown in FIG. 8, the second layer 43B is disposed on the first layer 43A, the insulating layer 47, and the third layer 42C of the magnetic pole 42. A part of the second layer 43B located near the medium facing surface 12a touches the top surface of the first layer 43A, and another part of the second layer 43B located away from the medium facing surface 12a touches the top surface of the third layer 42C.

The configurations of the magnetic pole 42 and the write shield 43 are not limited to the above-described configurations. For example, the magnetic pole 42 may be composed of one or two layers. The write shield 43 may be composed of one layer or three or more layers.

Figure 9:
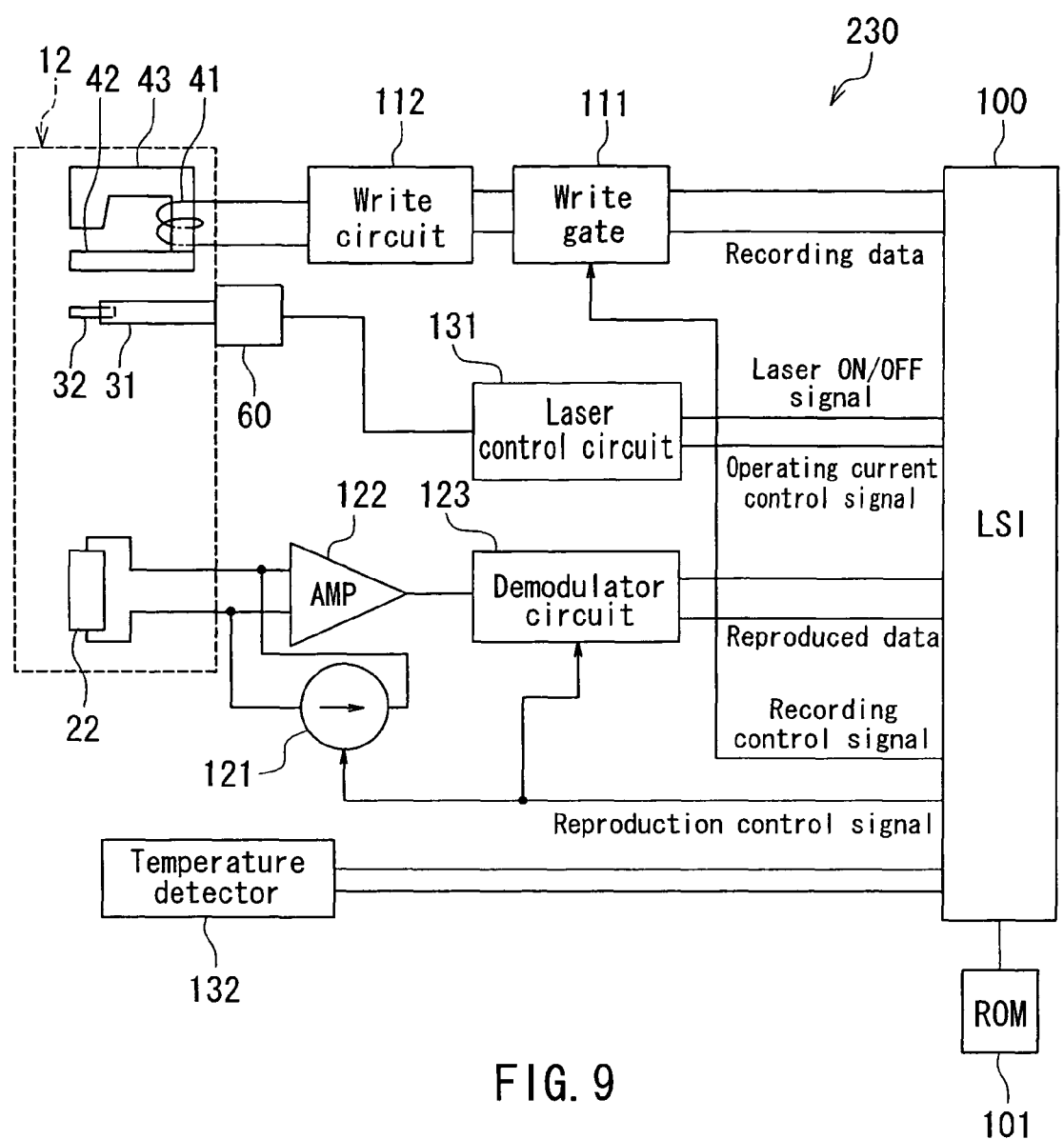
FIG. 9 is a block diagram showing a circuit configuration of the magnetic recording device according to the embodiment of the present invention.

Reference is now made to FIG. 9 to describe the circuit configuration of the control circuit 230 shown in FIG. 5 and the operation of the heat-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies recording data and a recording control signal to the write gate 111. The control LSI 100 supplies a reproduction control signal to the constant current circuit 121 and the demodulator circuit 123, and receives reproduced data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a recording operation, the control LSI 100 supplies recording data to the write gate 111. The write gate 111 supplies the recording data to the write circuit 112 only when the recording control signal indicates a recording operation. According to the recording data, the write circuit 112 passes a recording current through the coil 41. Consequently, the magnetic pole 42 produces a recording magnetic field and data is recorded on the magnetic recording layer of the magnetic disk 201 through the use of this recording magnetic field.

In a reproducing operation, the constant current circuit 121 supplies a certain sense current to the MR element 22 only when the reproduction control signal indicates a reproducing operation. The output voltage of the MR element 22 is amplified by the amplifier 122 and input to the demodulator circuit 123. When the reproduction control signal indicates a reproducing operation, the demodulator circuit 123 demodulates the output of the amplifier 122 to generate reproduced data, and supplies the reproduced data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and this laser light propagates through the waveguide 31. According to the principle of generation of near-field light described above, the near-field light 37 occurs from the near-field light generating part 32e of the surface plasmon generating element 32. The near-field light 37 heats a part of the magnetic recording layer of the magnetic disk 201, thereby lowering the coercivity of that part. When recording, data is recorded by applying the recording magnetic field produced by the magnetic pole 42 to the part of the magnetic recording layer with the lowered coercivity.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 37, and data that indicates the temperature dependence of the coercivity of the magnetic recording layer.

As shown in FIG. 9, the control circuit 230 has the signal system for controlling the laser diode 60, i.e., the signal system consisting of the laser ON/OFF signal and the operating current control signal, independent of the control signal system intended for recording/reproducing operations. This configuration makes it possible to implement various modes of energization of the laser diode 60, not only to energize the laser diode 60 simply in association with a recording operation. It should be noted that the circuit configuration of the control circuit 230 is not limited to that shown in FIG. 9.

Next, an example of the method of manufacturing the near-field light generating device 15 will be described with reference to FIG. 10A to FIG. 22A and FIG. 10B to FIG. 22B. In this example, the buffer part 33 and the clad part 34 are formed of the same material. FIG. 10A to FIG. 22A and FIG. 10B to FIG. 22B each show a stack of layers formed in the process of manufacturing the near-field light generating device 15. Each of FIG. 10A to FIG. 22A shows a cross section of part of the stack. Each of FIG. 10B to FIG. 22B shows the top surface of part of the stack. In FIG. 10B to FIG. 22B the broken line designated by the symbol "ABS" represents the position where the medium facing surface 12a is to be formed. The lines 10A-10A to 22A-22A in FIG. 10B to FIG. 22B show the positions of the cross sections shown in FIG. 10A to FIG. 22A, respectively. In FIG. 10A to FIG. 22A, portions closer to the slider substrate 11 than the base 27 are omitted.

FIG. 10A and FIG. 10B show a step of the manufacturing process of the near-field light generating device 15. In this step, a dielectric film 71 made of a dielectric material for constituting the clad part 34 is formed on the base 27. Next, as shown in FIG. 11A and FIG. 11B, a conductive film 32P made of a conductive material for constituting the surface plasmon generating element 32 is formed on the dielectric film 71. Next, as shown in FIG. 12A and FIG. 12B, a dielectric film 72 made of the dielectric material for constituting the clad part 34 is formed on the conductive film 32P.

Next, as shown in FIG. 13A and FIG. 13B, a mask 73 is formed on the dielectric film 72. The mask 73 has a planar shape (shape as seen from above) corresponding to the surface plasmon generating element 32 to be formed later. The mask 73 is formed by patterning a photoresist layer, for example.

Figure 14A:
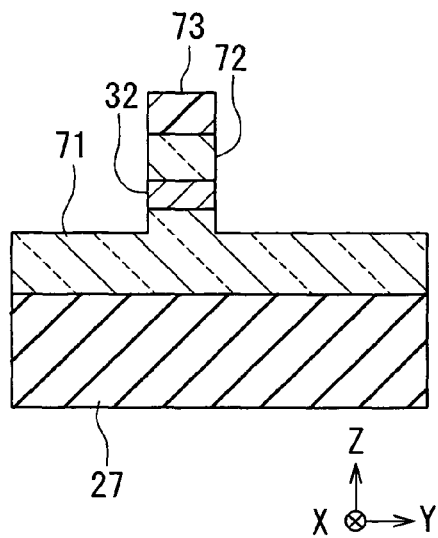
FIG. 14A and FIG. 14B are explanatory diagrams showing a step that follows the step of FIG. 13A and FIG. 13B.
Figure 14B:
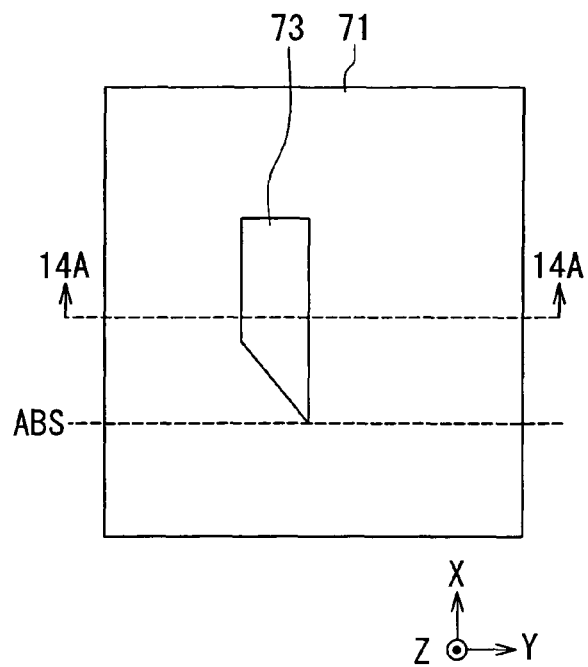
Figure 15A:
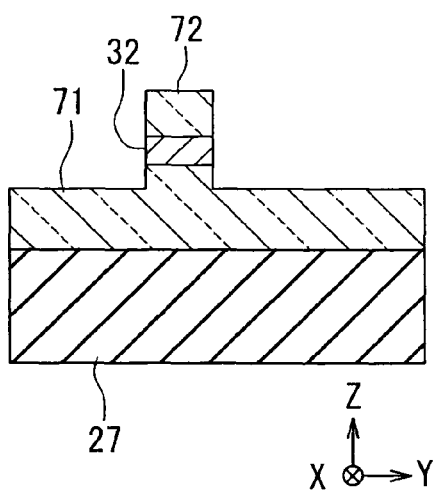
FIG. 15A and FIG. 15B are explanatory diagrams showing a step that follows the step of FIG. 14A and FIG. 14B.
Figure 15B:
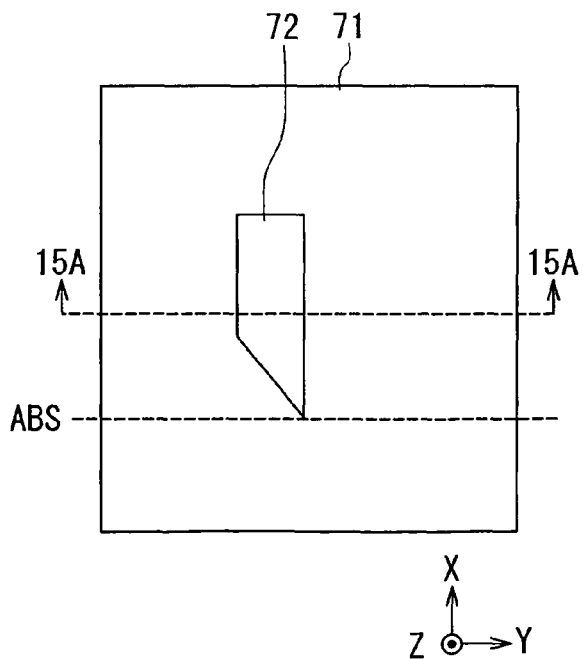

Next, as shown in FIG. 14A and FIG. 14B, the dielectric film 72, the conductive film 32P and the dielectric film 71 are selectively etched by, for example, reactive ion etching (hereinafter referred to as RIE) using the mask 73. This etching is performed so that the etched bottom lies at a level between the initial top and bottom surfaces of the dielectric film 71. By this etching, the conductive film 32P is patterned into the surface plasmon generating element 32. The mask 73 is then removed as shown in FIG. 15A and FIG. 15B.

Next, as shown in FIG. 16A and FIG. 16B, a dielectric film 74 made of the dielectric material for constituting the buffer part 33 and the clad part 34 is formed to cover the dielectric film 71, the surface plasmon generating element 32 and the dielectric film 72. Here, the dielectric film 74 is formed such that the areas of the dielectric film 74 adhering to the side surfaces of the surface plasmon generating element 32 have the same thickness as the desired thickness BT of the buffer part 33.

Next, as shown in FIG. 17A and FIG. 17B, a dielectric film 31P made of a dielectric material for constituting the waveguide 31 is formed to cover the entire stack shown in FIG. 16A and FIG. 16B. FIG. 17A, FIG. 17B and subsequent diagrams show the dielectric films 71, 72 and 74 collectively as a dielectric film 75.

Figure 18A:
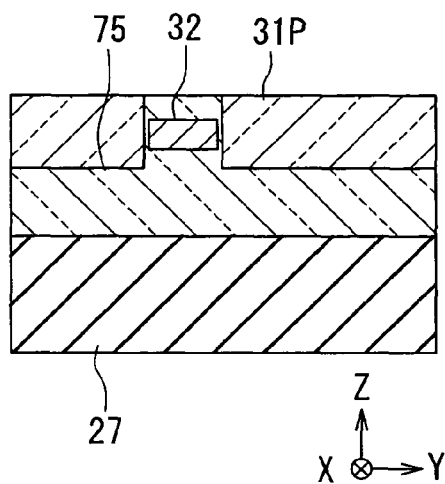
FIG. 18A and FIG. 18B are explanatory diagrams showing a step that follows the step of FIG. 17A and FIG. 17B.
Figure 18B:
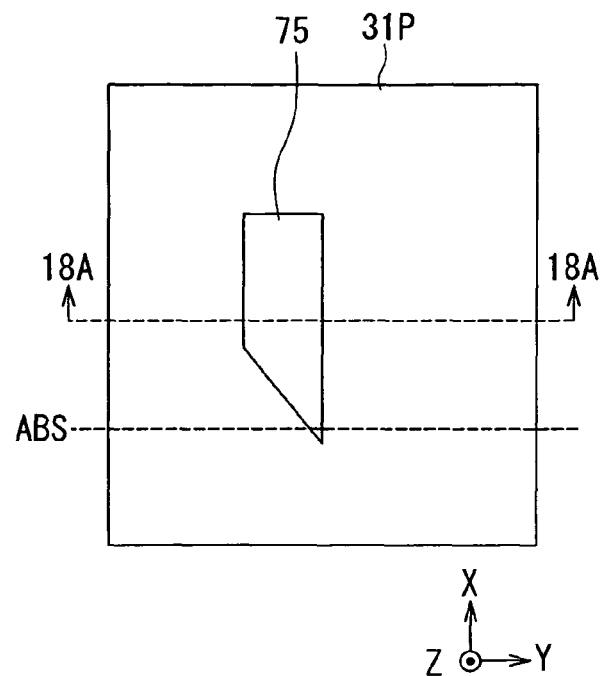

Next, as shown in FIG. 18A and FIG. 18B, the dielectric film 31P is polished until the portion of the dielectric film 75 located on the surface plasmon generating element 32 is exposed.

Figure 19A:
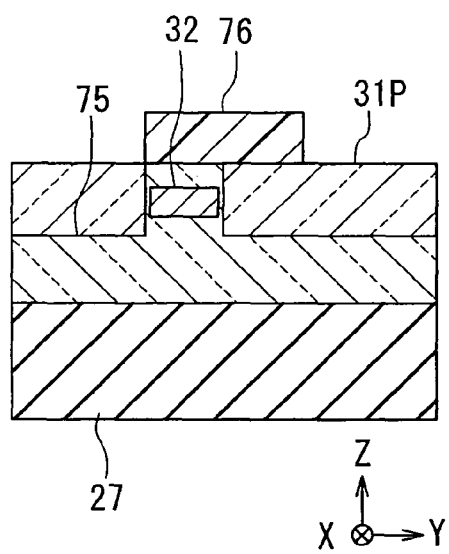
FIG. 19A and FIG. 19B are explanatory diagrams showing a step that follows the step of FIG. 18A and FIG. 18B.
Figure 19B:
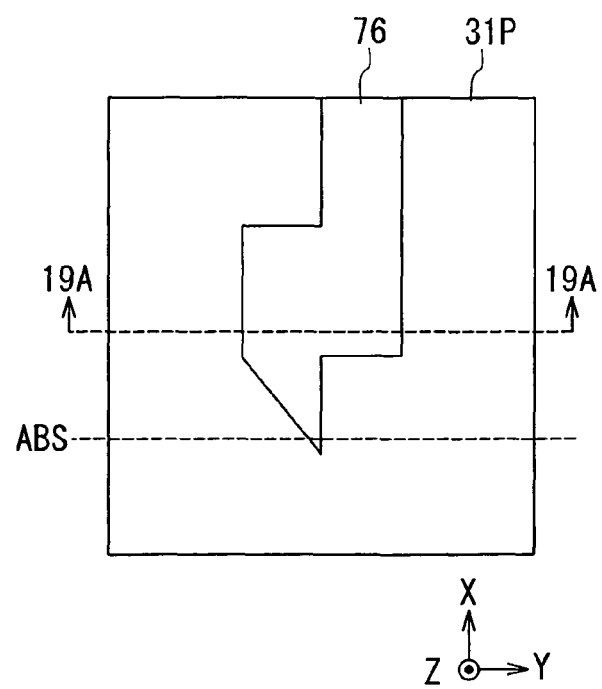

Next, as shown in FIG. 19A and FIG. 19B, a mask 76 is formed on the dielectric film 75 and the dielectric film 31P. The planar shape of the mask 76 is a combination of a part corresponding to the planar shape of the waveguide 31 and a part slightly greater than the planar shape of the surface plasmon generating element 32 and the buffer part 33. The mask 76 is formed by patterning a photoresist layer, for example.

Next, as shown in FIG. 20A and FIG. 20B, the dielectric film 75 and the dielectric film 31P are selectively etched by, for example, RIE using the mask 76. This etching is performed so that the etched bottom lies at a level the same as or lower than the level at which the initial bottom surface of the dielectric film 31P lies. By this etching, the dielectric film 31P is patterned into the waveguide 31. The mask 76 is then removed as shown in FIG. 21A and FIG. 21B. The part of the dielectric film 75 lying between the waveguide 31 and the surface plasmon generating element 32 makes the buffer part 33. Through the steps so far, the waveguide 31, the surface plasmon generating element 32 and the buffer part 33 are completed.

FIG. 22A and FIG. 22B show the next step. In this step, first, a dielectric film 77 made of the dielectric material for constituting the clad part 34 is formed to cover the stack shown in FIG. 21A and FIG. 21B. The dielectric films 75 and 77 constitute the clad part 34. In FIG. 22B the dielectric films 75 and 77 are omitted.

Now, an example of the method of forming the magnetic pole 42 will be described with reference to FIG. 22A and FIG. 22B. In this example, first, a part of the dielectric film 77 is etched to form a groove for accommodating the first layer 42A of the magnetic pole 42 in the dielectric film 77. Next, the first layer 42A is formed in this groove. Next, the top surfaces of the dielectric film 77 and the first layer 42A are polished for flattening. Next, the second layer 42B of the magnetic pole 42 is formed on the dielectric film 77 and the first layer 42A. Next, a dielectric film 78 is formed to cover the second layer 42B and the dielectric film 77. Next, the dielectric film 78 is polished until the second layer 42B is exposed. Then, although not shown, the third layer 42C of the magnetic pole 42 is formed on the second layer 42B and the dielectric film 78. The stack shown in FIG. 22B is to be polished later from the lower side of FIG. 22B up to the position designated by the symbol ABS, whereby the medium facing surface 12a is formed.

FIG. 23 is a cross-sectional view showing a modification example of the layout of the near-field light generating device 15 and the magnetic pole 42 according to the present embodiment. In this modification example, the top surface of the surface plasmon generating element 32 is located at almost the same level as the top surface of the waveguide 31. This modification example facilitates the formation of the magnetic pole 42. A description will now be given of an example of the method of forming the magnetic pole 42 according to this modification example. In this example, after forming the dielectric film 77, the dielectric film 77 is polished until the top surface of the waveguide 31 is exposed, for example, whereby the top surface of the dielectric film 77 is flattened. Next, the first layer 42A is formed on the flat top surface of the dielectric film 77. Next, a dielectric film 79 is formed to cover the first layer 42A and the dielectric film 77. Next, the dielectric film 79 is polished until the first layer 42A is exposed, whereby the top surfaces of the first layer 42A and the dielectric film 79 are flattened. Next, the second layer 42B is formed on the first layer 42A and the dielectric film 79. Next, a dielectric film 80 is formed to cover the second layer 42B and the dielectric film 79. Next, the dielectric film 80 is polished until the second layer 42B is exposed, whereby the top surfaces of the second layer 42B and the dielectric film 80 are flattened. Subsequently, although not shown, the third layer 42C is formed on the second layer 42B and the dielectric film 80. According to this example of the method of forming the magnetic pole 42, it is possible to form the first to third layers 42A to 42C on flat surfaces, respectively. This allows easy and precise formation of the first to third layers 42A to 42C.

It should be noted that the method of forming the magnetic pole 42 is not limited to the example described with reference to FIG. 22A and FIG. 22B, nor to the example described with reference to FIG. 23.

First to seventh modification examples of the near-field light generating device 15 according to the present embodiment will now be described with reference to FIG. 24 to FIG. 30. FIG. 24 to FIG. 30 are plan views respectively showing the first to seventh modification examples of the near-field light generating device 15.

Figure 24:
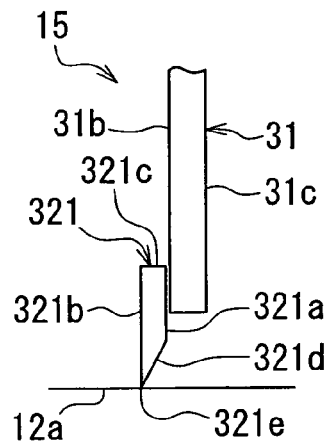
FIG. 24 is a plan view showing a first modification example of the near-field light generating device according to the embodiment of the present invention.

The near-field light generating device 15 according to the first modification example shown in FIG. 24 has a surface plasmon generating element 321 instead of the surface plasmon generating element 32 shown in FIG. 4. The surface plasmon generating element 321 has a bottom surface, a top surface, and four side surfaces 321a, 321b, 321c and 321d connecting the top and bottom surfaces to each other. The side surface 321a extends in the direction perpendicular to the medium facing surface 12a. A part of the side surface 321a is opposed to a part of the side surface 31b of the waveguide 31 with a predetermined spacing therebetween. An end of the side surface 321a closer to the medium facing surface 12a is located at a distance from the medium facing surface 12a. The side surface 321b lies opposite to the side surface 321a and extends in the direction perpendicular to the medium facing surface 12a. An end of the side surface 321b is located in the medium facing surface 12a. The side surface 321c is parallel to the medium facing surface 12a and connects the side surfaces 321a and 321b to each other at their respective ends farther from the medium facing surface 12a. The side surface 321d connects the end of the side surface 321b located in the medium facing surface 12a to the end of the side surface 321a closer to the medium facing surface 12a. The side surface 321d is tilted with respect to the direction perpendicular to the medium facing surface 12a so that the distance between the side surfaces 321b and 321d decreases toward the medium facing surface 12a. The surface plasmon generating element 321 further has a near-field light generating part 321e which is the edge formed between the side surfaces 321b and 321d and located in the medium facing surface 12a.

Figure 25:
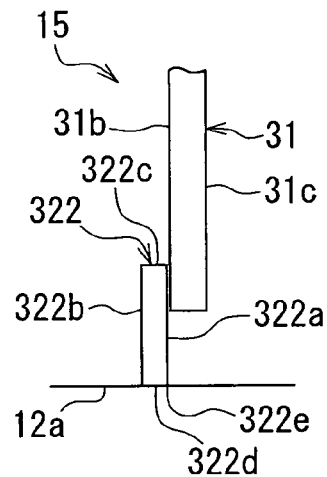
FIG. 25 is a plan view showing a second modification example of the near-field light generating device according to the embodiment of the present invention.

The near-field light generating device 15 according to the second modification example shown in FIG. 25 has a surface plasmon generating element 322 instead of the surface plasmon generating element 32 shown in FIG. 4. The surface plasmon generating element 322 has a bottom surface, a top surface, and four side surfaces 322a, 322b, 322c and 322d connecting the top and bottom surfaces to each other. The side surface 322a extends in the direction perpendicular to the medium facing surface 12a. A part of the side surface 322a is opposed to a part of the side surface 31b of the waveguide 31 with a predetermined spacing therebetween. An end of the side surface 322a is located in the medium facing surface 12a. The side surface 322b lies opposite to the side surface 322a and extends in the direction perpendicular to the medium facing surface 12a. An end of the side surface 322b is located in the medium facing surface 12a. The side surface 322c is parallel to the medium facing surface 12a and connects the side surfaces 322a and 322b to each other at their respective ends farther from the medium facing surface 12a. The side surface 322d is located in the medium facing surface 12a and connects the side surfaces 322a and 322b to each other at their respective ends located in the medium facing surface 12a. The surface plasmon generating element 322 further has a near-field light generating part 322e which is the edge formed between the side surfaces 322a and 322d and located in the medium facing surface 12a.

Figure 26:
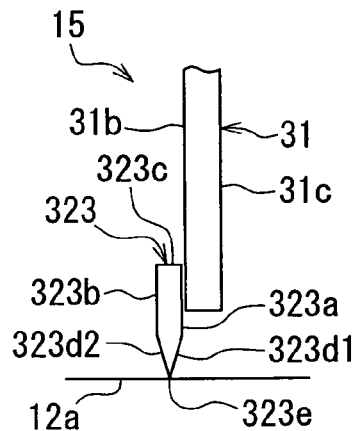
FIG. 26 is a plan view showing a third modification example of the near-field light generating device according to the embodiment of the present invention.

The near-field light generating device 15 according to the third modification example shown in FIG. 26 has a surface plasmon generating element 323 instead of the surface plasmon generating element 32 shown in FIG. 4. The surface plasmon generating element 323 has a bottom surface, a top surface, and five side surfaces 323a, 323b, 323c, 323d1 and 323d2 connecting the top and bottom surfaces to each other. The side surface 323a extends in the direction perpendicular to the medium facing surface 12a. A part of the side surface 323a is opposed to a part of the side surface 31b of the waveguide 31 with a predetermined spacing therebetween. An end of the side surface 323a closer to the medium facing surface 12a is located at a distance from the medium facing surface 12a. The side surface 323b lies opposite to the side surface 323a and extends in the direction perpendicular to the medium facing surface 12a. An end of the side surface 323b closer to the medium facing surface 12a is located at a distance from the medium facing surface 12a. The side surface 323c is parallel to the medium facing surface 12a and connects the side surfaces 323a and 323b to each other at their respective ends farther from the medium facing surface 12a. An end of the side surface 323d1 is connected to the end of the side surface 323a closer to the medium facing surface 12a. The other end of the side surface 323d1 is located in the medium facing surface 12a. An end of the side surface 323d2 is connected to the end of the side surface 323b closer to the medium facing surface 12a. The other end of the side surface 323d2 is located in the medium facing surface 12a and is connected to the other end of the side surface 323d1. The side surfaces 323d1 and 323d2 are tilted with respect to the direction perpendicular to the medium facing surface 12a so that the distance between the side surfaces 323d1 and 323d2 decreases toward the medium facing surface 12a. The surface plasmon generating element 323 further has a near-field light generating part 323e which is the edge formed between the side surfaces 323d1 and 323d2 and located in the medium facing surface 12a.

Figure 27:
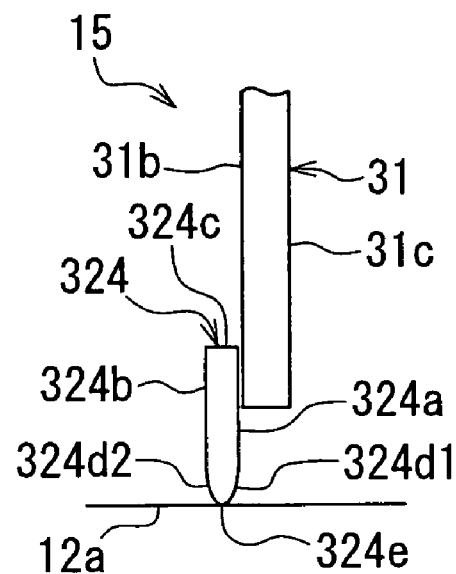
FIG. 27 is a plan view showing a fourth modification example of the near-field light generating device according to the embodiment of the present invention.

The near-field light generating device 15 according to the fourth modification example shown in FIG. 27 has a surface plasmon generating element 324 instead of the surface plasmon generating element 32 shown in FIG. 4. The surface plasmon generating element 324 has a bottom surface, a top surface, and five side surfaces 324a, 324b, 324c, 324d1 and 324d2 connecting the top and bottom surfaces to each other. The side surfaces 324a, 324b and 324c are the same as the side surfaces 323a, 323b and 323c of the third modification example shown in FIG. 26. The side surfaces 324d1 and 324d2 are shaped as if the side surfaces 323d1 and 323d2 of the third modification example shown in FIG. 26 are rounded. The surface plasmon generating element 324 further has a near-field light generating part 324e which is the part where the side surfaces 324d1 and 324d2 are connected to each other in the medium facing surface 12a.

Figure 28:
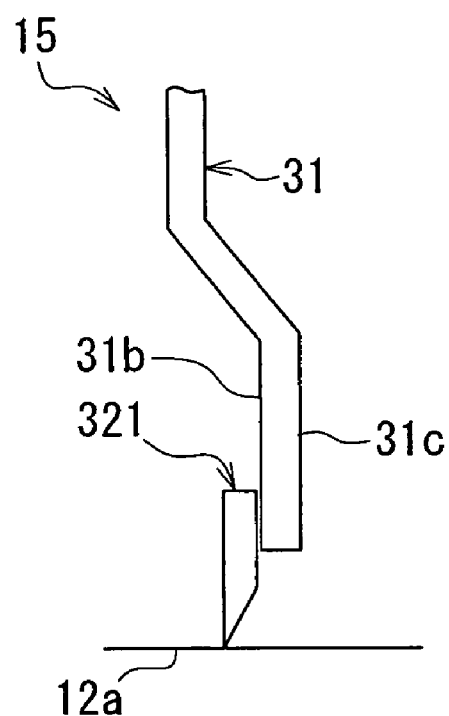
FIG. 28 is a plan view showing a fifth modification example of the near-field light generating device according to the embodiment of the present invention.

The near-field light generating device 15 according to the fifth modification example shown in FIG. 28 has a waveguide 31 that is curved in the middle. Note that FIG. 28 shows the surface plasmon generating element 321 according to the first modification example shown in FIG. 24. However, the fifth modification example may use any one of the surface plasmon generating elements shown in FIG. 4 and FIG. 24 to FIG. 27.

Figure 29:
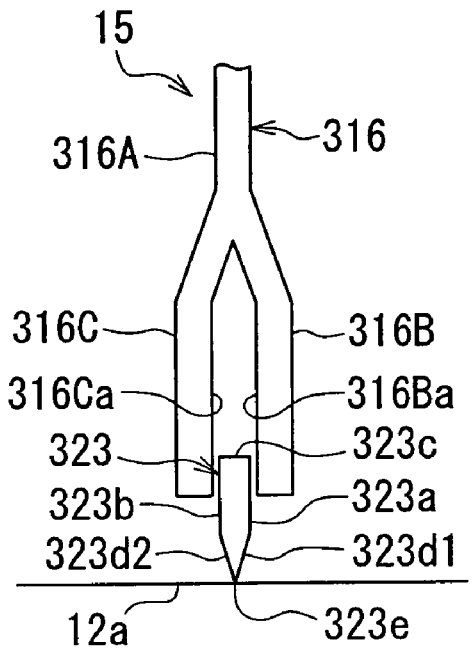
FIG. 29 is a plan view showing a sixth modification example of the near-field light generating device according to the embodiment of the present invention.

The near-field light generating device 15 according to the sixth modification example shown in FIG. 29 has a waveguide 316, and the surface plasmon generating element 323 according to the third modification example shown in FIG. 26. The waveguide 316 has a base part 316A and two branch parts 316B and 316C which are connected to an end of the base part 316A closer to the medium facing surface 12a. A side surface 316Ba of the branch part 316B and a side surface 316Ca of the branch part 316C are opposed to each other. A part of the surface plasmon generating element 323 is interposed between the side surfaces 316Ba and 316Ca. A part of the side surface 316Ba is opposed to a part of the side surface 323a of the surface plasmon generating element 323 with a predetermined spacing therebetween. A part of the side surface 316Ca is opposed to a part of the side surface 323b of the surface plasmon generating element 323 with a predetermined spacing therebetween.

According to the sixth modification example, laser light emitted from the laser diode 60 is incident on the base part 316A of the waveguide 316, and propagates through the base part 316A and then through the two branch parts 316B and 316C. Surface plasmons are then excited on each of the side surfaces 323a and 323b of the surface plasmon generating element 323. These surface plasmons propagate toward the near-field light generating part 323e, and near-field light occurs from the near-field light generating part 323e.

Figure 30:
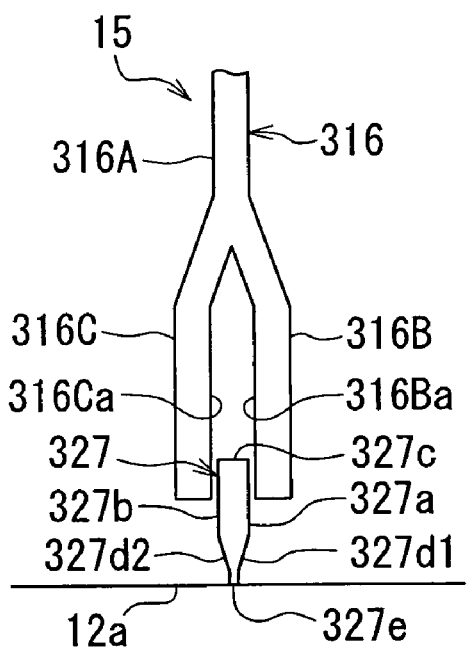
FIG. 30 is a plan view showing a seventh modification example of the near-field light generating device according to the embodiment of the present invention.

The near-field light generating device 15 according to the seventh modification example shown in FIG. 30 has the waveguide 316 according to the sixth modification example shown in FIG. 29 and a surface plasmon generating element 327. The surface plasmon generating element 327 has a bottom surface, a top surface, and six side surfaces 327a, 327b, 327c, 327d1, 327d2 and 327e connecting the top and bottom surfaces to each other. The side surfaces 327a, 327b and 327c are the same as the side surfaces 323a, 323b and 323c of the third modification example shown in FIG. 26. The side surfaces 327d1 and 327d2 are shaped as if the side surfaces 323d1 and 323d2 of the third modification example shown in FIG. 26 are deformed so that their respective portions close to the medium facing surface 12a are perpendicular to the medium facing surface 12a. The side surface 327e is located in the medium facing surface 12a and connects the side surfaces 327d1 and 327d2 to each other at their respective ends located in the medium facing surface 12a. In the seventh modification example, the side surface 327e makes the near-field light generating part. The operation of the near-field light generating device 15 according to the seventh modification example is the same as that of the sixth modification example.

Next, a description will be given of a first simulation by which a desirable lower limit of the light use efficiency of the near-field light generating device 15 was determined. Here, the light use efficiency will be defined as $I_{OUT}/I_{IN}$ in percentage. $I_{IN}$ is the intensity of laser light that is incident on the waveguide 31. $I_{OUT}$ is the intensity of near-field light that occurs from the near-field light generating part 32e of the surface plasmon generating element 32. The conditions of the first simulation will now be described. The desirable lower limit of the light use efficiency shall be a value at which the magnetic recording layer can be heated to a temperature of 300° C. or higher which is typically required for heat-assisted magnetic recording. The magnetic recording medium was a 3.5-inch magnetic disk formed by stacking the following layers on a disk substrate in the following order: a 50-nm-thick soft magnetic backing layer made of a laminate of a CoFe layer, a Ru layer and a CoFe layer; a 15-nm-thick underlayer made of Ru; a 25-nm-thick magnetic recording layer (perpendicular magnetization layer) made of CoCrPt; and a 2-nm-thick protection film made of DLC. The rotation speed of the magnetic disk was 7200 rpm. The distance between the surface of the magnetic disk and the near-field light generating part 32e was 8 nm. The intensity of the laser light incident on the waveguide 31 was 18 mW. As the result of the first simulation, the desirable lower limit of the light use efficiency was found to be 17.0%.

Figure 31:
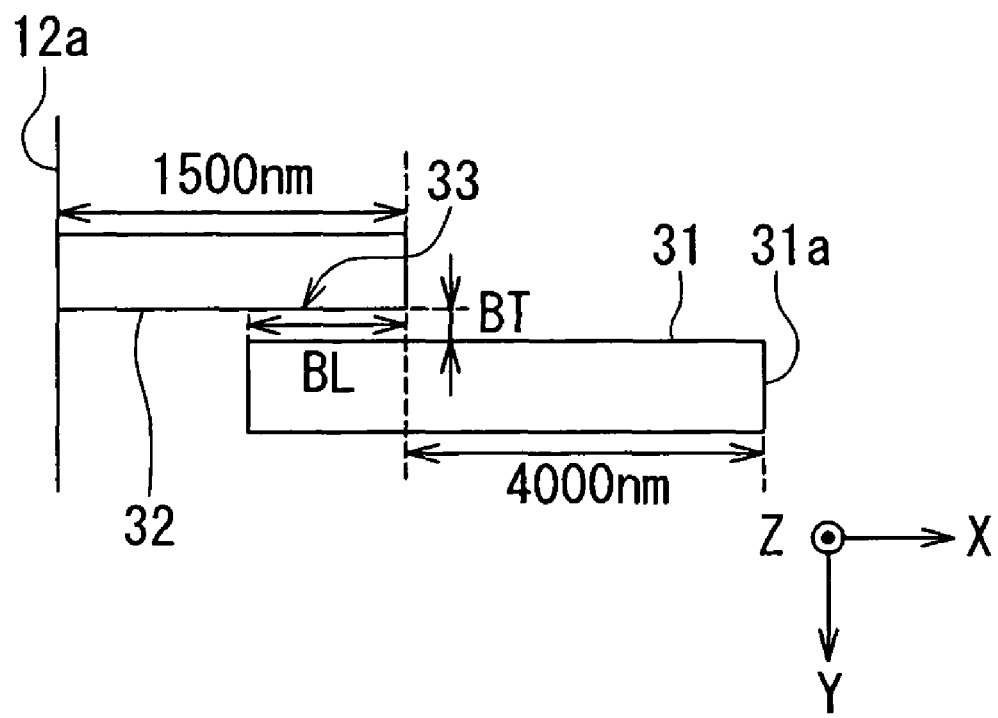
FIG. 31 is a plan view of a model of the near-field light generating device used in simulations.
Figure 32:
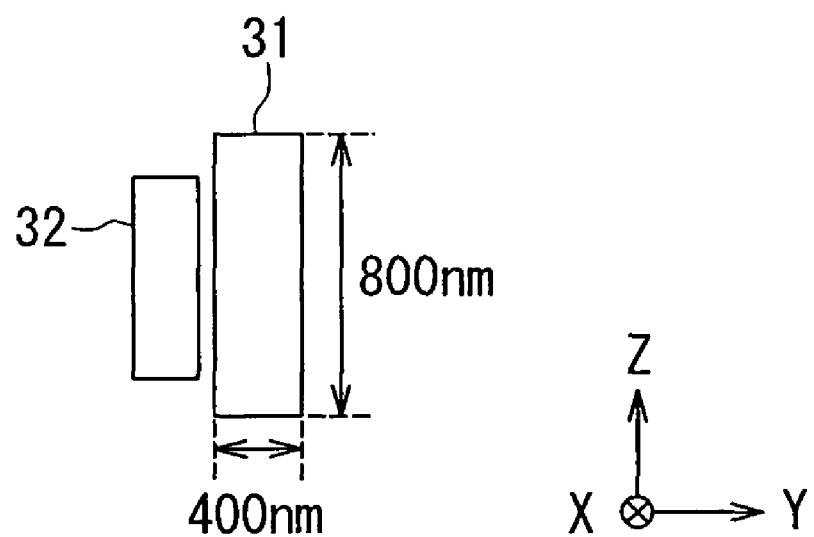
FIG. 32 is a front view of the model of the near-field light generating device shown in FIG. 31.

A description will now be given of a second simulation by which the desirable ranges of the thickness BT and the length BL of the buffer part 33 were determined. Initially, a description will be given of a model of the near-field light generating device 15 used in the second simulation. FIG. 31 is a plan view of the model of the near-field light generating device 15. FIG. 32 is a front view of the model of the near-field light generating device 15 shown in FIG. 31. In this model, as shown in FIG. 31, the length from the incidence end 31a of the waveguide 31 to the buffer part 33 was 4000 nm. As shown in FIG. 32, the width of the waveguide 31 in the Y direction was 400 nm, and the thickness (dimension in the Z direction) of the waveguide 31 was 800 nm. As shown in FIG. 31, the length of the surface plasmon generating element 32 in the direction perpendicular to the medium facing surface 12a (the X direction) was 1500 nm. The material of the buffer part 33 and the clad part 34 was $Al_2O_3$.

Figure 33:
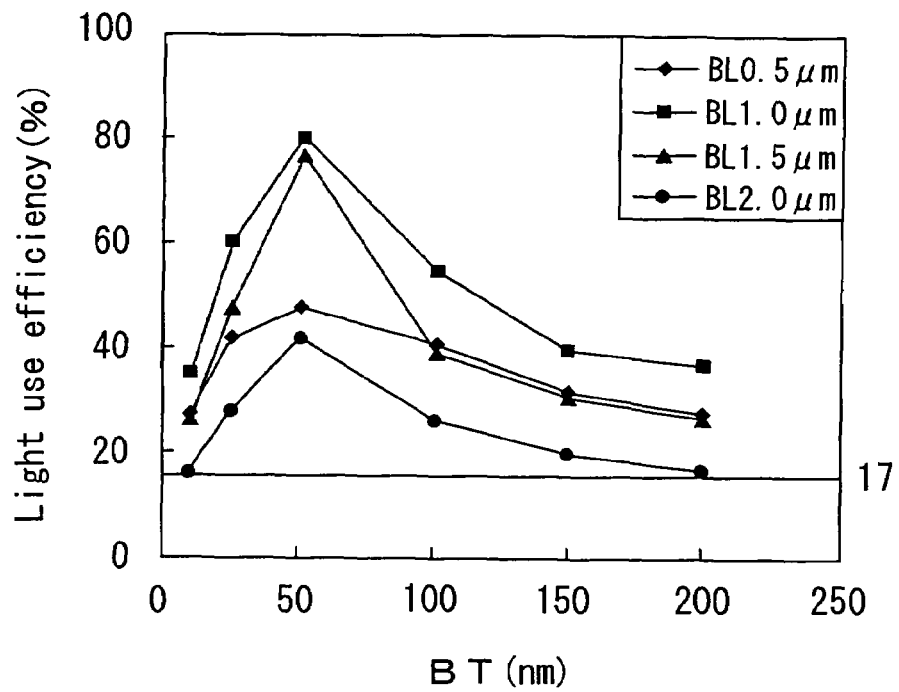
FIG. 33 is a characteristic chart showing the results of a simulation performed using the model shown in FIG. 31 and FIG. 32.
Figure 34:
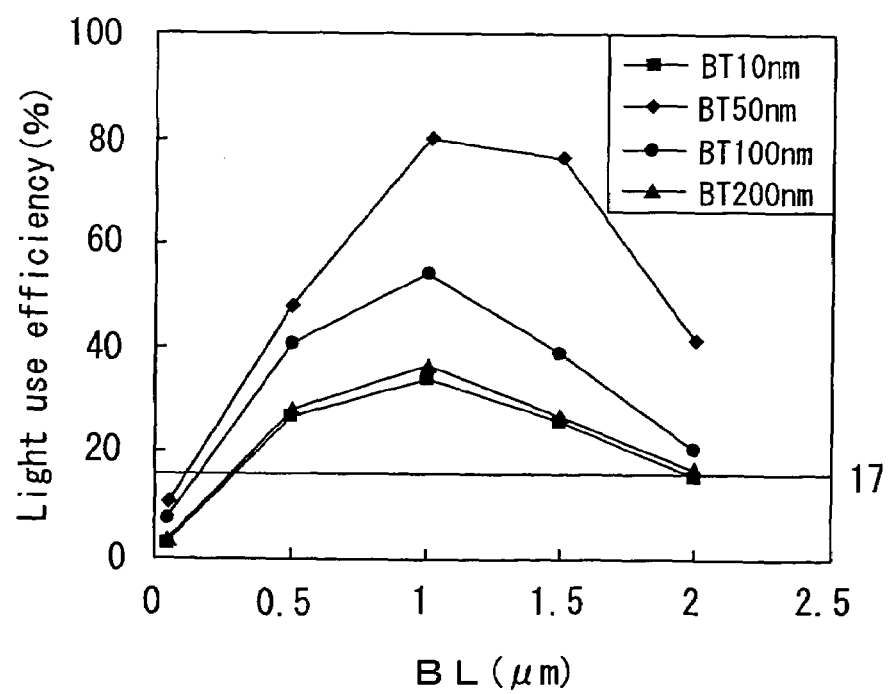
FIG. 34 is a characteristic chart showing the results of the simulation performed using the model shown in FIG. 31 and FIG. 32.
Figure 35:
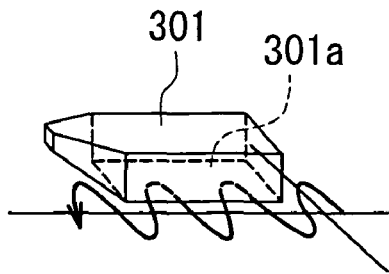
FIG. 35 is an explanatory diagram showing a first mode of the relationship between the coupling surface of a surface plasmon generating element and the direction of polarization of laser light.
Figure 36:
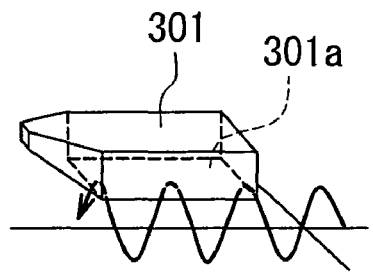
FIG. 36 is an explanatory diagram showing a second mode of the relationship between the coupling surface of the surface plasmon generating element and the direction of polarization of laser light.
Figure 37:
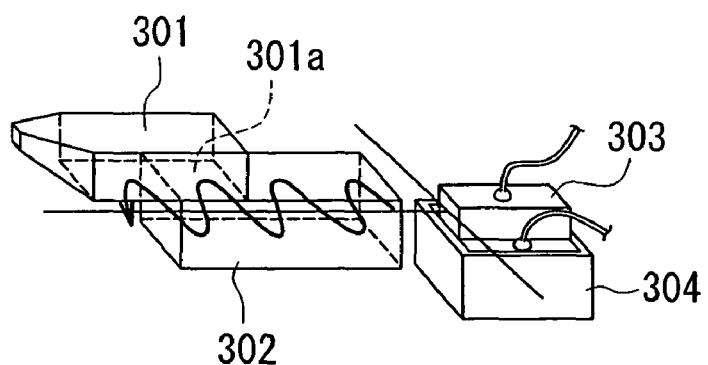
FIG. 37 is an explanatory diagram showing an example of the positional relationship among the surface plasmon generating element, a waveguide, a laser diode, and a support member.

In the second simulation, the light use efficiency was determined for a large number of models with the thickness BT of the buffer part 33 varied within the range of 10 to 200 nm and the length BL of the buffer part 33 varied within the range of 0.05 to 2 μm. The results are shown in FIG. 33 and FIG. 34. FIG. 33 shows the relationship between BT and the light use efficiency for the cases where BL is 0.5 μm, 1.0 μm, 1.5 μm, and 2.0 μm. FIG. 34 shows the relationship between BL and the light use efficiency for the cases where BT is 10 nm, 50 nm, 100 nm, and 200 nm. It can be seen from FIG. 33 and FIG. 34 that BT preferably falls within the range of 10 to 200 nm and BL preferably falls within the range of 0.5 to 2.0 μm in order to maintain the light use efficiency at or above the desirable lower limit of 17.0% which was determined by the first simulation.

As has been described, in the near-field light generating device 15 according to the present embodiment, evanescent light occurs from the part of the side surface 31b of the waveguide 31 to which the coupling part 32a1 of the surface plasmon generating element 32 is opposed. The coupling part 32a1 is coupled with the evanescent light to excite surface plasmons, and near-field light occurs from the near-field light generating part 32e based on the surface plasmons. According to the present embodiment, the laser light incident on the waveguide 31 can be converted into the near-field light with high light use efficiency. The present embodiment thus makes it possible to prevent a part of the medium facing surface 12a from protruding due to conversion of the energy of the laser light into thermal energy in the heat-assisted recording head 1.

In the present embodiment, the waveguide 31 and the surface plasmon generating element 32 are disposed above the top surface 27a of the base 27 so as to adjoin each other in the direction parallel to the top surface 27a of the base 27. Consequently, according to the present embodiment, laser light whose electric field oscillates in the direction parallel to the top surface 27a of the base 27, i.e., TE-polarized light, can be made incident on the waveguide 31 using a typical TE-polarization laser. This makes it possible to achieve easy generation of surface plasmons of high intensity by the surface plasmon generating element 32 while using TE-polarized light as the laser light to propagate through the waveguide 31.

According to the present embodiment, since the waveguide 31 and the surface plasmon generating element 32 are disposed above the top surface 27a of the base 27 so as to adjoin each other in the direction parallel to the top surface 27a of the base 27, it is possible to easily pattern the waveguide 31 and the surface plasmon generating element 32 into desired shapes in desired positional relationship.

The present invention is not limited to the foregoing embodiment but can be carried out in various modifications. For example, in the foregoing embodiment the end face of the magnetic pole 42 (the end face of the first layer 42A) is located in the medium facing surface 12a at a position forward of the near-field light generating part 32e along the Z direction (in other words, located closer to the trailing end). However, the end face of the magnetic pole 42 may be located backward of the near-field light generating part 32e along the Z direction (in other words, located closer to the leading end) in the medium facing surface 12a.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A near-field light generating device comprising:
a base having a top surface;
a waveguide that allows laser light to propagate therethrough and is disposed above the top surface of the base; and
a surface plasmon generating element that is disposed above the top surface of the base so as to adjoin the waveguide in a direction parallel to the top surface of the base, wherein:
the waveguide has a side surface that faces the surface plasmon generating element; and
the surface plasmon generating element includes: a coupling part that is opposed to a part of the side surface of the waveguide with spacing therebetween and causes excitation of a surface plasmon by coupling with evanescent light occurring from the part of the side surface; and a near-field light generating part that generates near-field light based on the surface plasmon excited at the coupling part, the coupling part of the surface plasmon generating element overlaps with the part of the side surface of the waveguide at a surface area, the surface area being substantially perpendicular to the top surface of the base.

2. The near-field light generating device according to claim 1, wherein the surface plasmon generating element is made of one element selected from the group consisting of Pd, Pt, Rh, Ir, Ru, Au, Ag, Cu and Al, or an alloy composed of a plurality of elements selected from this group.

3. The near-field light generating device according to claim 1, further comprising a buffer part that has a refractive index lower than that of the waveguide and is interposed between the part of the side surface of the waveguide and the coupling part.

4. The near-field light generating device according to claim 1, wherein the spacing between the part of the side surface of the waveguide and the coupling part falls within a range of 10 to 200 nm.

5. The near-field light generating device according to claim 1, wherein the coupling part has a length within a range of 0.5 to 2.0 μm.

6. The near-field light generating device according to claim 1, further comprising a laser diode that emits laser light whose electric field oscillates in the direction parallel to the top surface of the base, and that allows the laser light to be incident on the waveguide.

7. The near-field light generating device according to claim 6, further comprising a support member that supports the laser diode, wherein the support member has a top surface parallel to the top surface of the base, and the laser diode is mounted on the top surface of the support member.

8. A heat-assisted magnetic recording head comprising:
a medium facing surface that faces a magnetic recording medium;
a magnetic pole that has an end face located in the medium facing surface and produces a recording magnetic field for recording data on the magnetic recording medium; and
a near-field light generating device that generates near-field light to be applied to the magnetic recording medium when data is recorded on the magnetic recording medium using the recording magnetic field,
the near-field light generating device comprising:
a base having a top surface;
a waveguide that allows laser light to propagate therethrough and is disposed above the top surface of the base; and
a surface plasmon generating element that is disposed above the top surface of the base so as to adjoin the waveguide in a direction parallel to the top surface of the base, wherein:
the waveguide has a side surface that faces the surface plasmon generating element; and
the surface plasmon generating element includes: a coupling part that is opposed to a part of the side surface of the waveguide with spacing therebetween and causes excitation of a surface plasmon by coupling with evanescent light occurring from the part of the side surface; and a near-field light generating part that is located in the medium facing surface and generates the near-field light based on the surface plasmon excited at the coupling part, the coupling part of the surface plasmon generating element overlaps with the part of the side surface of the waveguide at a surface area, the surface area being substantially perpendicular to the top surface of the base.

9. The heat-assisted magnetic recording head according to claim 8, wherein the surface plasmon generating element is made of one element selected from the group consisting of Pd, Pt, Rh, Ir, Ru, Au, Ag, Cu and Al, or an alloy composed of a plurality of elements selected from this group.

10. The heat-assisted magnetic recording head according to claim 8, wherein the near-field light generating device further comprises a buffer part that has a refractive index lower than that of the waveguide and that is interposed between the part of the side surface of the waveguide and the coupling part.

11. The heat-assisted magnetic recording head according to claim 8, wherein the spacing between the part of the side surface of the waveguide and the coupling part falls within a range of 10 to 200 nm.

12. The heat-assisted magnetic recording head according to claim 8, wherein the coupling part has a length within a range of 0.5 to 2.0 μm.

13. The heat-assisted magnetic recording head according to claim 8, wherein the near-field light generating device further comprises a laser diode that emits laser light whose electric field oscillates in the direction parallel to the top surface of the base, and that allows the laser light to be incident on the waveguide.

14. The heat-assisted magnetic recording head according to claim 13, wherein the near-field light generating device further comprises a support member that supports the laser diode, wherein the support member has a top surface parallel to the top surface of the base, and the laser diode is mounted on the top surface of the support member.

15. A head gimbal assembly comprising:
a heat-assisted magnetic recording head; and
a suspension that supports the heat-assisted magnetic recording head,
the heat-assisted magnetic recording head comprising:
a medium facing surface that faces a magnetic recording medium;
a magnetic pole that has an end face located in the medium facing surface and produces a recording magnetic field for recording data on the magnetic recording medium; and
a near-field light generating device that generates near-field light to be applied to the magnetic recording medium when data is recorded on the magnetic recording medium using the recording magnetic field,
the near-field light generating device comprising:
a base having a top surface;
a waveguide that allows laser light to propagate therethrough and is disposed above the top surface of the base;
a surface plasmon generating element that is disposed above the top surface of the base so as to adjoin the waveguide in a direction parallel to the top surface of the base; and
a laser diode that emits laser light whose electric field oscillates in the direction parallel to the top surface of the base, and that allows the laser light to be incident on the waveguide, wherein:
the waveguide has a side surface that faces the surface plasmon generating element; and
the surface plasmon generating element includes: a coupling part that is opposed to a part of the side surface of the waveguide with spacing therebetween and causes excitation of a surface plasmon by coupling with evanescent light occurring from the part of the side surface; and a near-field light generating part that is located in the medium facing surface and generates the near-field light based on the surface plasmon excited at the coupling part, the coupling part of the surface plasmon generating element overlaps with the part of the side surface of the waveguide at a surface area, the surface area being substantially perpendicular to the top surface of the base.

16. A magnetic recording device comprising:
a magnetic recording medium;
a heat-assisted magnetic recording head; and
a positioning device that supports the heat-assisted magnetic recording head and positions the heat-assisted magnetic recording head with respect to the magnetic recording medium,
the heat-assisted magnetic recording head comprising:
a medium facing surface that faces the magnetic recording medium;
a magnetic pole that has an end face located in the medium facing surface and produces a recording magnetic field for recording data on the magnetic recording medium; and
a near-field light generating device that generates near-field light to be applied to the magnetic recording medium when data is recorded on the magnetic recording medium using the recording magnetic field,
the near-field light generating device comprising:
a base having a top surface;
a waveguide that allows laser light to propagate therethrough and is disposed above the top surface of the base;
a surface plasmon generating element that is disposed above the top surface of the base so as to adjoin the waveguide in a direction parallel to the top surface of the base; and
a laser diode that emits laser light whose electric field oscillates in the direction parallel to the top surface of the base, and that allows the laser light to be incident on the waveguide, wherein:
the waveguide has a side surface that faces the surface plasmon generating element; and
the surface plasmon generating element includes: a coupling part that is opposed to a part of the side surface of the waveguide with spacing therebetween and causes excitation of a surface plasmon by coupling with evanescent light occurring from the part of the side surface; and a near-field light generating part that is located in the medium facing surface and generates the near-field light based on the surface plasmon excited at the coupling part, the coupling part of the surface plasmon generating element overlaps with the part of the side surface of the waveguide at a surface area, the surface area being substantially perpendicular to the top surface of the base.

* * * * *